US010775199B2

(12) United States Patent
Cook

(10) Patent No.: US 10,775,199 B2
(45) Date of Patent: Sep. 15, 2020

(54) WINDING AND SCALE CONFIGURATION FOR INDUCTIVE POSITION ENCODER

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

(*) Notice: Subject to any disclaimer, the term of this patent is extended or adjusted under 35 U.S.C. 154(b) by 238 days.

(21) Appl. No.: 15/910,478

(22) Filed: Mar. 2, 2018

(65) Prior Publication Data

US 2018/0195880 A1 Jul. 12, 2018

Related U.S. Application Data

(63) Continuation-in-part of application No. 15/850,457, filed on Dec. 21, 2017, now Pat. No. 10,612,943, (Continued)

(51) Int. Cl.
*G01D 5/20* (2006.01)
*G01B 3/00* (2006.01)
(Continued)

(52) U.S. Cl.
CPC ............ *G01D 5/2053* (2013.01); *G01B 3/004* (2013.01); *G01B 3/205* (2013.01); *G01B 7/003* (2013.01); *G01B 7/023* (2013.01)

(58) Field of Classification Search
CPC ........ G01D 5/202; G01D 5/204; G01D 5/244; G01D 5/2086; G01D 5/00; G01D 5/2457;
(Continued)

(56) References Cited

U.S. PATENT DOCUMENTS 5,841,274 A * 11/1998 Masreliez ............ G01D 5/2053
324/207.17
5,886,519 A * 3/1999 Masreliez .............. G01B 3/205
324/207.17
(Continued)

FOREIGN PATENT DOCUMENTS

CN 1272620 A 11/2000
CN 1441226 A 9/2003
(Continued)

OTHER PUBLICATIONS

Chinese Office Action, dated Jul. 2, 2019, for Chinese Application No. 2017107342215, 22 pages. (with English Translation).
(Continued)

*Primary Examiner* — Patrick Assouad
*Assistant Examiner* — Sean Curtis
(74) *Attorney, Agent, or Firm* — Seed IP Law Group LLP

(57) ABSTRACT

A pitch compensated inductive position encoder includes a scale comprising first and second tracks including periodic patterns having a wavelength W, a detector, and signal processing. The second track pattern may be shifted along the measuring direction by a pattern offset STO relative to the first track pattern. In the detector, first-track and second-track field generating coil portions generate fields in first and second interior areas aligned with the first and second pattern tracks, respectively. First and second sensing coil configurations that are aligned with the first and second tracks, respectively, are offset relative to one another by STO+/−0.5*W along the measuring direction. In various embodiments, the first and second sensing coil configurations may have the same sequence of individual coil polarities if the generated field polarities are different, and may have inverted or opposite sequences if the generated field polarities are the same.

11 Claims, 13 Drawing Sheets

Related U.S. Application Data which is a continuation-in-part of application No. 15/245,560, filed on Aug. 24, 2016, now Pat. No. 10,520,335.

(51) Int. Cl.
  *G01B 7/00* (2006.01)
  *G01B 7/02* (2006.01)
  *G01B 3/20* (2006.01)

(58) Field of Classification Search
  CPC .............. G01D 5/2492; G01D 5/2455; G01D 5/24452; G01D 5/2053; G01D 5/2497; G01D 5/25; G01D 5/2451; G01D 5/34746; G01D 5/347; G01D 5/34776; G01B 7/14; G01B 7/003; G01B 7/023; G01B 3/004; G01B 3/205; G01J 1/0266; G01J 3/0289; G01J 5/089
  USPC .............. 324/207.15–207.17, 207.23–207.26
  See application file for complete search history.

(56) References Cited

U.S. PATENT DOCUMENTS

| | | | |
|---|---|---|---|
| 5,894,678 A | 4/1999 | Masreliez et al. | |
| 5,901,458 A * | 5/1999 | Andermo | G01D 5/2086 324/207.24 |
| 5,936,399 A * | 8/1999 | Andermo | G01D 5/202 324/207.17 |
| 5,973,494 A * | 10/1999 | Masreliez | G01D 5/2046 324/207.17 |
| 5,998,990 A * | 12/1999 | Andermo | G01D 5/2086 324/207.12 |
| 6,002,250 A * | 12/1999 | Masreliez | G01D 5/2053 324/207.16 |
| 6,011,389 A * | 1/2000 | Masreliez | G01D 5/2046 324/207.17 |
| 6,049,204 A * | 4/2000 | Andermo | G01B 7/02 324/207.12 |
| 6,124,708 A | 9/2000 | Dames | |
| 6,157,188 A * | 12/2000 | Steinke | G01B 7/003 324/207.17 |
| 6,259,249 B1 * | 7/2001 | Miyata | G01B 7/003 324/207.12 |
| 6,329,813 B1 * | 12/2001 | Andermo | G01B 3/205 324/207.12 |
| 6,335,618 B1 * | 1/2002 | Nahum | G01B 3/205 324/207.17 |
| 6,400,138 B1 * | 6/2002 | Andermo | G01B 3/205 324/207.12 |
| 6,522,129 B2 * | 2/2003 | Miyata | G01D 5/2053 324/207.16 |
| 6,531,866 B2 * | 3/2003 | Miyata | G01D 5/2086 324/207.12 |
| 6,545,461 B1 * | 4/2003 | Miyata | G01D 5/2053 324/207.17 |
| 6,573,707 B2 * | 6/2003 | Kiriyama | G01D 5/2086 324/207.17 |
| 6,628,115 B2 * | 9/2003 | Sasaki | G01B 7/003 324/207.17 |
| 6,646,433 B2 * | 11/2003 | Milvich | G01D 5/2053 324/207.12 |
| 6,646,434 B2 * | 11/2003 | Miyata | G01D 5/208 324/207.17 |
| 6,714,004 B2 * | 3/2004 | Jagiella | F15B 15/2846 324/207.16 |
| 6,720,760 B2 * | 4/2004 | Milvich | G01D 5/2086 324/207.17 |
| 7,015,687 B2 * | 3/2006 | Meyer | G01D 5/2053 324/207.17 |
| 7,239,130 B1 * | 7/2007 | Milvich | G01D 5/2086 324/207.12 |
| 7,530,177 B1 * | 5/2009 | Meichle | G01B 3/205 33/708 |
| 7,652,469 B2 * | 1/2010 | Meyer | G01D 5/202 324/207.15 |
| 7,705,585 B2 * | 4/2010 | Howard | G01D 5/2053 324/207.17 |
| 7,906,958 B2 | 3/2011 | Nakayama et al. | |
| 8,222,891 B2 * | 7/2012 | Steinke | G01D 5/24476 324/207.17 |
| 8,309,906 B2 * | 11/2012 | Kapner | G01D 5/24476 250/231.16 |
| 8,847,583 B2 * | 9/2014 | Sasaki | G01D 5/2086 324/207.17 |
| 8,928,311 B2 * | 1/2015 | Sasaki | G01D 5/2073 324/207.17 |
| 9,267,819 B2 * | 2/2016 | Cook | G01D 5/20 |
| 9,435,663 B2 * | 9/2016 | Cook | G01D 5/2066 |
| D774,928 S * | 12/2016 | Matsumiya | D10/73 |
| 9,612,136 B1 * | 4/2017 | Cook | G01D 5/2455 |
| 9,618,366 B2 * | 4/2017 | Nahum | G01D 5/2053 |
| 9,678,701 B2 * | 6/2017 | Cook | G06F 3/14 |
| 9,778,072 B1 * | 10/2017 | Nahum | G01D 5/2451 |
| 9,833,802 B2 * | 12/2017 | Kalistaja | H05K 3/1241 |
| 9,835,473 B2 * | 12/2017 | Nahum | G01D 5/2086 |
| 9,958,294 B2 * | 5/2018 | Cook | G01D 5/20 |
| 10,520,335 B2 * | 12/2019 | Cook | G01B 3/205 |
| 10,551,217 B2 * | 2/2020 | Cook | G01D 5/20 |
| 10,591,316 B2 * | 3/2020 | Cook | G01B 3/205 |
| 10,612,943 B2 * | 4/2020 | Cook | G01D 5/202 |
| 2001/0003422 A1 * | 6/2001 | Andermo | G01D 5/2495 324/207.17 |
| 2001/0020846 A1 * | 9/2001 | Miyata | G01B 7/003 324/207.17 |
| 2002/0030484 A1 * | 3/2002 | Kiriyama | G01D 5/2086 324/207.17 |
| 2002/0030485 A1 * | 3/2002 | Gleixner | G01D 5/2073 324/207.17 |
| 2003/0090264 A1 * | 5/2003 | Milvich | G01D 5/2086 324/207.16 |
| 2003/0128028 A1 * | 7/2003 | Jordil | G01B 7/02 324/207.21 |
| 2003/0160608 A1 * | 8/2003 | Milvich | G01D 5/2053 324/207.17 |
| 2006/0103376 A1 * | 5/2006 | Ma | G01D 5/2451 324/207.24 |
| 2009/0119940 A1 * | 5/2009 | Meichle | G01B 3/205 33/708 |
| 2011/0254541 A1 * | 10/2011 | Sasaki | G01D 5/2086 324/207.15 |
| 2012/0007591 A1 * | 1/2012 | Howard | G01B 7/14 324/207.15 |
| 2014/0184202 A1 * | 7/2014 | Horiguchi | G01B 7/003 324/207.11 |
| 2015/0375246 A1 * | 12/2015 | Kalistaja | B05B 17/04 174/250 |
| 2016/0054154 A1 * | 2/2016 | Cook | G01D 5/34776 324/207.17 |
| 2016/0146636 A1 * | 5/2016 | Nahum | G01D 5/2053 324/207.17 |
| 2017/0089738 A1 * | 3/2017 | Cook | G01D 5/2455 |
| 2017/0268905 A1 * | 9/2017 | Nahum | G01D 5/2451 |
| 2017/0268906 A1 * | 9/2017 | Nahum | G01D 5/2086 |
| 2018/0058883 A1 * | 3/2018 | Cook | G01D 5/202 |
| 2018/0113004 A1 * | 4/2018 | Cook | G01D 5/2216 |
| 2018/0180452 A1 * | 6/2018 | Cook | G01D 5/2086 |
| 2018/0195880 A1 * | 7/2018 | Cook | G01B 3/004 |
| 2019/0120660 A1 * | 4/2019 | Hitchman | G01D 5/2497 |
| 2019/0301895 A1 * | 10/2019 | Cook | G01B 3/205 |
| 2020/0003581 A1 * | 1/2020 | Cook | G01D 5/2053 |
| 2020/0003583 A1 * | 1/2020 | Cook | G01D 5/2013 |

FOREIGN PATENT DOCUMENTS

| | | |
|---|---|---|
| CN | 105415882 A | 3/2016 |
| EP | 1 014 041 B1 | 5/2005 |

(56) References Cited

FOREIGN PATENT DOCUMENTS

| JP | 2018004628 A | * | 1/2018 | ........... G01D 5/2497 |
| JP | 2018031777 A | * | 3/2018 | ............. G01D 5/202 |
| JP | 2018105854 A | * | 7/2018 | ......... G01D 5/34792 |

OTHER PUBLICATIONS

Cook, "Absolute Position Encoder Including Scale With Varying Spatial Characteristic and Utilizing Fourier Transform or Other Signal Processing," U.S. Appl. No. 15/199,723, filed Jun. 30, 2016, 35 pages.

* cited by examiner

WINDING AND SCALE CONFIGURATION FOR INDUCTIVE POSITION ENCODER

CROSS-REFERENCE TO RELATED APPLICATION(S)

This application is a continuation-in-part of U.S. patent application Ser. No. 15/850,457, entitled "WINDING AND SCALE CONFIGURATION FOR INDUCTIVE POSITION ENCODER", filed Dec. 21, 2017, which is a continuation-in-part of U.S. patent application Ser. No. 15/245,560, entitled "WINDING CONFIGURATION FOR INDUCTIVE POSITION ENCODER," filed Aug. 24, 2016, the disclosures of which are each hereby incorporated herein by reference in their entirety.

BACKGROUND

Technical Field

This disclosure relates to measurement instruments, and more particularly to inductive position encoders that may be utilized in precision measurement instruments.

Description of the Related Art

Various encoder configurations may include various types of optical, capacitive, magnetic, inductive, movement and/or position transducers. These transducers use various geometric configurations of a transmitter and a receiver in a read head to measure movement between the read head and a scale. Magnetic and inductive transducers are relatively robust to contamination, but not perfectly so.

U.S. Pat. No. 6,011,389 (the '389 patent) describes an induced current position transducer usable in high accuracy applications, U.S. Pat. No. 5,973,494 (the '494 patent) and U.S. Pat. No. 6,002,250 (the '250 patent) describe incremental position inductive calipers and linear scales, including signal generating and processing circuits, and U.S. Pat. No. 5,886,519 (the '519 patent), U.S. Pat. No. 5,841,274 (the '274 patent), and U.S. Pat. No. 5,894,678 (the '678 patent) describe absolute position inductive calipers and electronic tape measures using an induced current transducer. U.S. Pat. No. 7,906,958 (the '958 patent) describes an induced current position transducer usable in high accuracy applications, wherein a scale having two parallel halves and a plurality of sets of transmitting coils and receiving coils mitigates certain signal offset components that may otherwise produce errors in an induced current position transducer. However, the '958 patent requires an unconventional scale, and shows only schematic coil layouts. As such, its teachings, although useful, are related to signals produced by "ideal" sensors or at least "identical" sensors. In contrast, it fails to consider and/or solve certain fabrication problems and/or limitations that typically result in "non-ideal" sensors arising from practical layout, fabrication, and cost constraints. These problems and associated design factors are discussed in greater detail below.

All of the foregoing U.S. patents enumerated above are hereby incorporated herein by reference in their entireties. As described in these patents, an induced current transducer may be manufactured using printed circuit board technology and is largely immune to contamination.

However, prior art systems are limited in their ability to provide certain combinations of features desired by users, such as combinations of compact size, signal strength, high resolution, cost, practical layout, and robustness to misalignment and contamination, etc. Configurations of encoders that provide improved combinations would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An electronic position encoder is provided that is usable to measure a relative position between two elements along a measuring axis direction that coincides with an x-axis direction. In various implementations, the electronic position encoder includes a scale and a detector portion. In various implementations, a signal processing configuration may be operably connected to the detector portion to provide a drive signal (e.g., to a field generating coil configuration) and determine the relative position between the detector portion and the scale pattern based on detector signals input from the detector portion (e.g., from a sensing coil configuration). In various implementations, the signal processing configuration may be integrated with the detector portion (e.g., as a circuit on a circuit board used as a substrate for the detector portion). In other implementations, the signal processing configuration may include external circuits connected to the detector portion through a connector.

The scale extends along the measuring axis direction and includes a signal modulating scale pattern comprising first and second pattern tracks arranged parallel to one another. Each pattern track comprises field attenuating elements that locally attenuate a changing magnetic flux to a relatively larger degree, and field sustaining elements that locally attenuate a changing magnetic flux to a relatively smaller degree or locally enhance the changing magnetic flux. The field attenuating elements and the field sustaining elements are interleaved along the x-axis direction in a periodic pattern that has a spatial wavelength W.

The detector portion is configured to be mounted proximate to the pattern tracks and to move along the measuring axis direction relative to the pattern tracks. In various implementations, the detector portion includes a field generating coil configuration and a sensing coil configuration.

The field generating coil configuration comprises at least one field generating loop which may be fixed on a substrate. The field generating coil configuration is configured to provide a changing first magnetic flux in a first interior area aligned with the first pattern track in response to a coil drive signal, and to provide a changing second magnetic flux in a second interior area aligned with the second pattern track, in response to a coil drive signal.

The sensing coil configuration comprises a first track first spatial phase signal sensing coil configuration, and a second track first spatial phase signal sensing coil configuration. In various implementations, the sensing coil configuration may also comprise first and second track "additional" spatial phase signal coil configurations (e.g., second, third, fourth spatial phase signal coil configurations, and so on) analogous to the first and second track first spatial phase signal coil configurations, according to known principles, and depending on the desired signal processing and position measurement techniques to be used in conjunction with the detector portion.

The first track first spatial phase signal sensing coil configuration is arranged in the first interior area, and comprises a set of N positive polarity windings distributed in positive polarity winding zones that repeat along the x-axis direction corresponding to the spatial wavelength W, and a set of N negative polarity windings distributed in negative polarity winding zones that alternate with the positive polarity winding zones and repeat along the x-axis direction corresponding to the spatial wavelength W. N is an integer that is at least 2. The positive and negative polarity windings each respond to a local effect on the changing magnetic flux provided by adjacent field attenuating elements or field sustaining elements and provide signal contributions to a first track first spatial phase signal component provided by the first track first spatial phase signal sensing coil configuration. The second track first spatial phase signal sensing coil configuration is arranged in the second interior area, and comprises a set of M positive polarity windings distributed in positive polarity winding zones that repeat along the x-axis direction corresponding to the spatial wavelength W, and a set of M negative polarity windings distributed in negative polarity winding zones that alternate with the positive polarity winding zones and repeat along the x-axis direction corresponding to the spatial wavelength W. M is an integer that is at least 2. The positive and negative polarity windings each respond to a local effect on the changing magnetic flux provided by adjacent field attenuating elements or field sustaining elements and provide signal contributions to a second track first spatial phase signal component provided by the second track first spatial phase signal sensing coil configuration.

In contrast to prior art configurations (e.g., as disclosed in the '958 patent), the first track first spatial phase signal sensing coil configuration and the second track first spatial phase signal sensing coil configuration define first and second sensing spans, respectively, along the x-axis direction, and the first and second sensing spans are not aligned with one another along the x-axis direction and the first track first spatial phase signal sensing coil configuration and the second track first spatial phase signal sensing coil configuration are not symmetrical to one another with respect to a border line along the x-axis direction between the first and second pattern tracks. This provides certain practical design freedoms and other advantages described in greater detail below.

In contrast to prior art configurations (e.g., as disclosed in the '958 patent), in various embodiments, the periodic pattern of the second pattern track is aligned with or shifted along the x-axis direction relative to the periodic pattern of the first pattern track by a scale track pattern offset STO that is not 0.5*W (where W is the scale pattern wavelength or pitch).

In various embodiments, the electronic position encoder is configured according to one of A) or B), wherein:

A) The field generating coil configuration is configured to provide changing magnetic flux of opposite polarities in the first interior area along the first pattern track and the second interior area along the second pattern track; and proceeding along the sensing coil configuration from a starting end, the first track first spatial phase signal sensing coil configuration has a configuration wherein its starting end winding along the first track has a first winding polarity, and the second track first spatial phase signal sensing coil configuration has a configuration wherein its starting end winding along the second track also has the first winding polarity, and the starting end windings along the first and second tracks are offset from one another by a winding offset WO=STO+/−0.5*W along the x-axis direction.

Or:

B) The field generating coil configuration is configured to provide changing magnetic flux of the same polarity in the first interior area along the first pattern track and the second interior area along the second pattern track; and proceeding along the sensing coil configuration from a starting end, the first track first spatial phase signal sensing coil configuration has a configuration wherein its starting end winding along the first pattern track has a first winding polarity, and the second track first spatial phase signal sensing coil configuration has a configuration wherein its starting end winding along the second pattern track has a second winding polarity that is opposite to the first winding polarity, and the starting end windings along the first and second tracks are offset from one another by a winding offset WO=STO+/−0.5*W along the x-axis direction.

In various embodiments according to either A) or B), N may be equal to M. In various embodiments according to either A) or B), the scale pattern offset STO may be within the range 0+/−0.25 W. In some embodiments according to either A) or B), the scale pattern offset STO may be zero, which corresponds to the configuration of a conventional scale. In various embodiments according to either A) or B), the windings of the first and second track first spatial phase signal sensing coils comprise conductors fabricated in layers of a printed circuit board, wherein the conductors include feedthroughs that connect between different layers of the printed circuit board, and no feedthroughs are included in the portions of the windings that are located in the first and second interior areas.

In various embodiments according to either A) or B), the first track first spatial phase signal component and the second track first spatial phase signal component are combined to form a combined first spatial phase signal. In some such embodiments, the respective windings of the first track first spatial phase signal sensing coil configuration and the second track first spatial phase signal sensing coil configuration comprise respective portions of a continuous conductor, and the first track first spatial phase signal component and the second track first spatial phase signal component are inherently combined in the continuous conductor to form the combined first spatial phase signal. In other such embodiments, a signal processing configuration may be operably connected to the detector portion as previously outlined, and the first track first spatial phase signal component and the second track first spatial phase signal component are connected to be inputs of the signal processing circuit and combined by signal processing to form the combined first spatial phase signal.

In various embodiments according to A), proceeding along the sensing coil configuration from the starting end, the first track first spatial phase signal sensing coil configuration has a configuration wherein its starting end winding along the first track has the first winding polarity, and its finishing end winding has the second winding polarity that is opposite to the first winding polarity. In such a case, the second track first spatial phase signal sensing coil configuration has a configuration wherein its starting end winding along the second track has the first winding polarity, and its finishing end winding has the second winding polarity that is opposite to the first winding polarity.

In various other embodiments according to A), proceeding along the sensing coil configuration from the starting end, the first track first spatial phase signal sensing coil configuration has a configuration wherein its starting end winding along the first track has the first winding polarity, and its finishing end winding also has the first winding polarity, and at least one winding zone between its starting end winding and its finishing end winding includes two windings that have the second winding polarity that is opposite to the first winding polarity. In such a case, the second track first spatial phase signal sensing coil configuration has a configuration wherein its starting end winding along the second track has the first winding polarity, and its finishing end winding also has the first winding polarity, and at least one winding zone between its starting end winding and its finishing end winding includes two windings that have the second winding polarity that is opposite to the first winding polarity.

In various embodiments according to B), proceeding along the sensing coil configuration from a starting end, the first track first spatial phase signal sensing coil configuration has a configuration wherein its starting end winding along the first track has the first winding polarity, and its finishing end winding has the second winding polarity that is opposite to the first winding polarity. In such a case, the second track first spatial phase signal sensing coil configuration has a configuration wherein its starting end winding along the second track has the second winding polarity that is opposite to the first winding polarity, and its finishing end winding has the first winding polarity.

In various other embodiments according to B), proceeding along the sensing coil configuration from the starting end, the first track first spatial phase signal sensing coil configuration has a configuration wherein its starting end winding along the first track has the first winding polarity, and its finishing end winding also has the first winding polarity, and at least one winding zone between its starting end winding and its finishing end winding includes two windings that have the second winding polarity that is opposite to the first winding polarity. In such a case, the second track first spatial phase signal sensing coil configuration has a configuration wherein its starting end winding along the second track has the second winding polarity that is opposite to the first winding polarity, and its finishing end winding also has the second winding polarity that is opposite to the first winding polarity, and at least one winding zone between its starting end winding and its finishing end winding includes two windings that have the first winding polarity.

The most basic combinations of design features disclosed above are sufficient to eliminate certain design constraints that have been taken for granted in the prior art (e.g., in the '958 patent) as being necessary design constraints in order to compensate or neutralize certain "offset" signal components in inductive encoders. As one example, the '958 patent requires an unconventional scale that is not widely available (that is, a scale having two parallel tracks wherein the scale pattern is offset by one half of its scale pitch, relative to one another). Such a scale carries a cost and availability penalty, and is not compatible with other types of detectors. Advantageously, either unconventional or conventional scales may be used with various corresponding embodiments disclosed herein. As another example, the prior art (e.g., the '958 patent), assumes or requires perfect symmetry in the two symmetric halves of the detector portion that align along two parallel scale tracks. However, this fails to consider that layout and routing asymmetries may arise due to practical layout, fabrication or manufacturing constraints, which will lead to various signal asymmetries and prevent "signal offset" neutralization from being achieved. This is particularly true considering that multiple "spatial phase" coil configurations must be superimposed in the same area, in contrast to the simple "single phase" schematic representations shown in the '958 patent. This is also particularly true for relatively longer detector designs that may require many sensing loops having small dimensions in order to achieve high resolution and adequate signal levels. Advantageously, the various detector portion design principles disclosed herein allow a greater number of practical layout and fabrication alternatives, and potential signal asymmetries that may otherwise arise due to practical layout and fabrication constraints may be reduced to insignificance according to layout principles and features disclosed herein.

Advantageously, the various design principles and features disclosed herein also provide alternatives for overcoming position measurement errors arising from "dynamic pitch" effects, such as those explained in U.S. Pat. Nos. 5,998,990 and 7,239,130 (the '990 and '130 patents, respectively), each of which are hereby incorporated herein by reference in their entirety. The design principles and features disclosed herein may be used separately or in combination with those disclosed in the '990 and/or '130 patents, for example, to reduce and/or neutralize errors arising from "dynamic pitch" effects, while at the same time using conventional scales and/or lower cost detector portion design configurations, even for fine pitch and/or high resolution position encoders.

DETAILED DESCRIPTION

Figure 1:
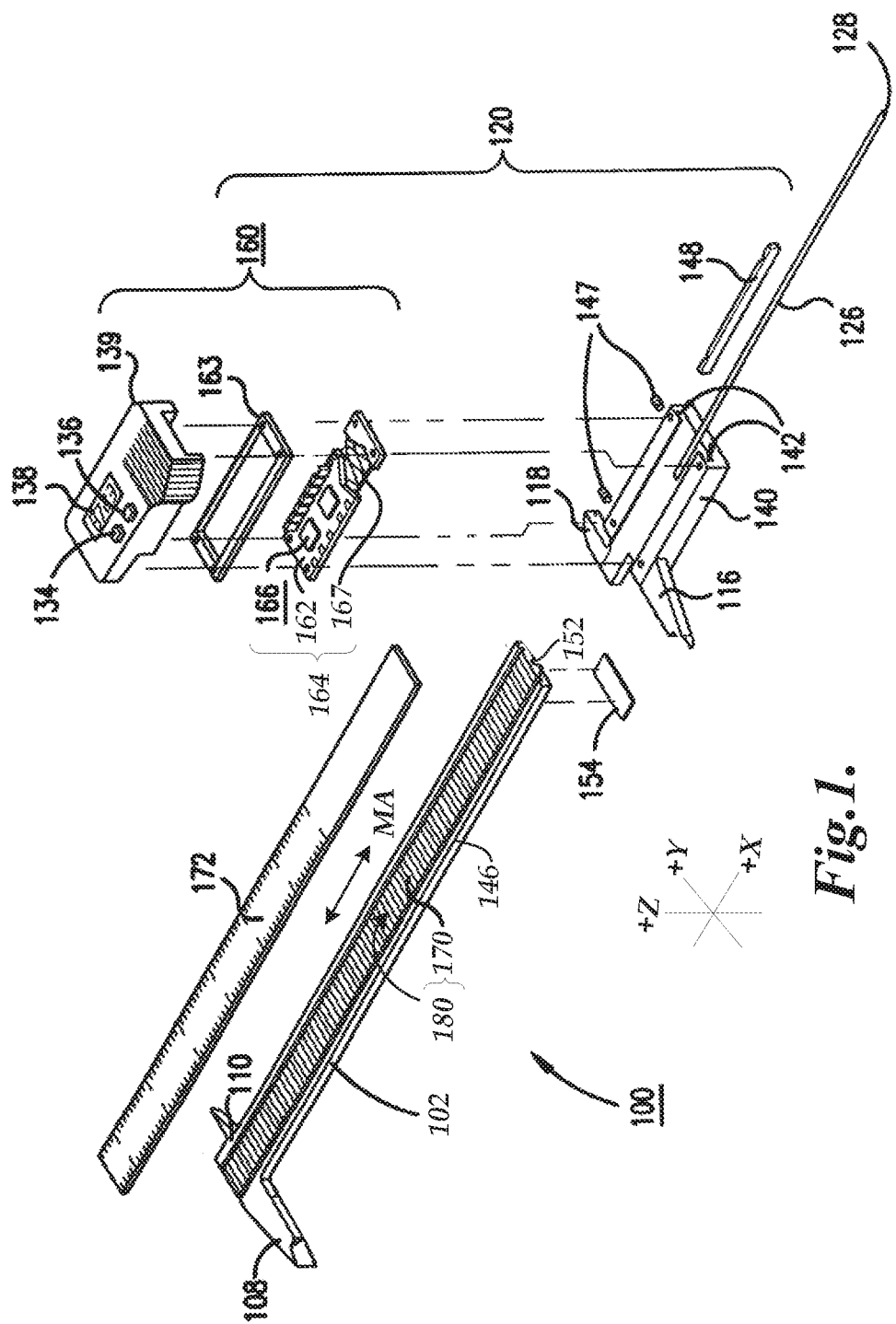
FIG. 1 is an exploded isometric view diagram of a hand tool type caliper utilizing an electronic position encoder including a detector portion and a scale.

FIG. 1 is an exploded isometric view diagram of a hand tool type caliper 100 including a scale member 102 having a spar of roughly rectangular cross-section including a scale 170, and slider assembly 120. In various implementations, the scale 170 may extend along the measuring axis direction MA (e.g., corresponding to an x-axis direction) and may include a signal modulating scale pattern 180. A known type of cover layer 172 (e.g., 100 μm thick) may cover the scale 170. Jaws 108 and 110 near a first end of the scale member 102 and movable jaws 116 and 118 on the slider assembly 120 are used to measure dimensions of objects in a known manner. The slider assembly 120 may optionally include a depth bar 126, restrained in a depth bar groove 152 under the scale member 102, by an end stop 154. The depth bar engagement end 128 may extend into a hole to measure its depth. A cover 139 of the slider assembly 120 may include an on/off switch 134, a zero-setting switch 136 and a measurement display 138. A base 140 of the slider assembly 120 includes a guiding edge 142 which contacts a side edge 146 of the scale member 102, and screws 147 bias a resilient pressure bar 148 against a mating edge of the scale member 102 to ensure proper alignment for measuring, and for moving a read head portion 164 relative to the scale 170.

A pickoff assembly 160 mounted on the base 140 holds the read head portion 164 which, in this implementation, includes substrate 162 (e.g., a printed circuit board) that carries a detector portion 167 including a field generating coil and a group of sensing elements (e.g., collectively a field generating and sensing winding configuration) arranged along the measuring axis direction MA, and a signal processing configuration 166 (e.g., a control circuit). A resilient seal 163 may be compressed between the cover 139 and the substrate 162 to exclude contamination from the circuitry and connections. The detector portion 167 may be covered by an insulative coating.

In one specific illustrative example, the detector portion 167 may be arranged parallel with and facing the scale 170, and a front face of the detector portion 167 that faces the scale 170 may be separated from the scale 170 (and/or the scale pattern 180) by a gap on the order of 0.5 mm along the depth (Z) direction. Together, the read head portion 164 and the scale 170 may form a transducer as part of an electronic position encoder. In one implementation, the transducer may be an eddy current transducer which operates by generating changing magnetic fields, wherein the changing magnetic fields induce circulating currents, known as eddy currents, in some of the signal modulating elements of the scale pattern 180 that are placed within the changing magnetic field, as will be described in more detail below. It will be appreciated that the caliper 100 shown in FIG. 1 is one of various applications that typically implement an electronic position encoder that has evolved over a number of years to provide a relatively optimized combination of compact size, low power operation (e.g., for long battery life), high resolution and high accuracy measurement, low cost, and robustness to contamination, etc. Even small improvements in any of these factors are highly desirable, but difficult to achieve, especially in light of the design constraints imposed in order to achieve commercial success in the various applications. The principles disclosed in the following description provide improvements in a number of these factors in a particularly cost effective and compact manner.

Figure 2:
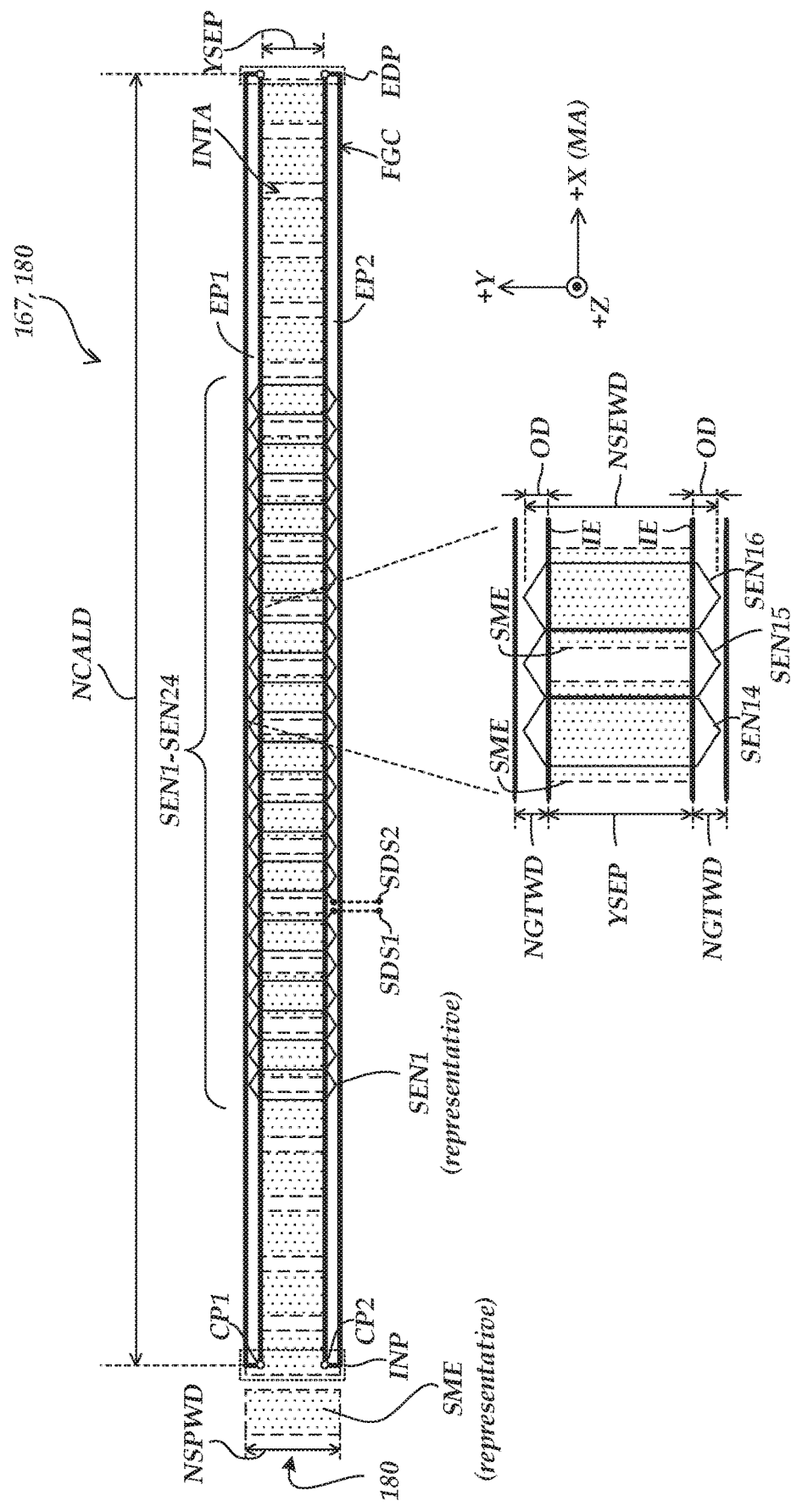
FIG. 2 is a plan view diagram illustrating a first exemplary implementation of a detector portion usable in an electronic position encoder.

FIG. 2 is a plan view diagram of a first exemplary implementation usable as the detector portion 167 and the signal modulating scale pattern 180 in the electronic position encoder shown in FIG. 1, or the like. FIG. 2 may be regarded as partly representational, partly schematic. An enlarged section of the detector portion 167 and scale pattern 180 is illustrated in the lower portion of FIG. 2. In FIG. 2, the various elements described below are represented by their shape or outline, and are shown superimposed on one another to emphasize certain geometric relationships. It should be understood that various elements may reside on different fabrication layers located at different planes along the z-axis direction, as needed to provide various operating gaps and/or insulating layers, as will be apparent to one of ordinary skill in the art based on the following description and/or as outlined in greater detail with reference to FIG. 4, below. Throughout the figures of this disclosure, it will be appreciated that the x-axis, y-axis and/or z-axis dimensions of one or more elements may be exaggerated for clarity.

The illustrated portion of the scale pattern 180 includes signal modulating elements SME shown in dashed outline, which are located on the scale 170 (shown in FIG. 1). The y-direction extremes of most of the signal modulating elements SME are hidden below the first and second elongated portions EP1 and EP2 in the embodiment illustrated in FIG. 2. It will be appreciated that the scale pattern 180 moves relative to the detector portion 167 during operation, as may be seen in FIG. 1.

In the example of FIG. 2, the scale pattern 180 has a nominal scale pattern width dimension NSPWD along a y-direction that is perpendicular to the x-axis, and comprises discrete signal modulating elements SME that are arranged periodically along the measuring axis direction MA (e.g., corresponding to an x-axis direction). However, more generally the scale pattern 180 may comprise various alternative spatially modulated patterns including discrete elements or one or more continuous pattern element(s), provided that the pattern has a spatial characteristic which changes as a function of position along the x-axis direction, so as to provide position dependent detector signals (also referred to as detector signal components, in some embodiments) arising in the sensing elements SEN (e.g., SEN14) of the detector portion 167, according to known methods.

Figure 4:
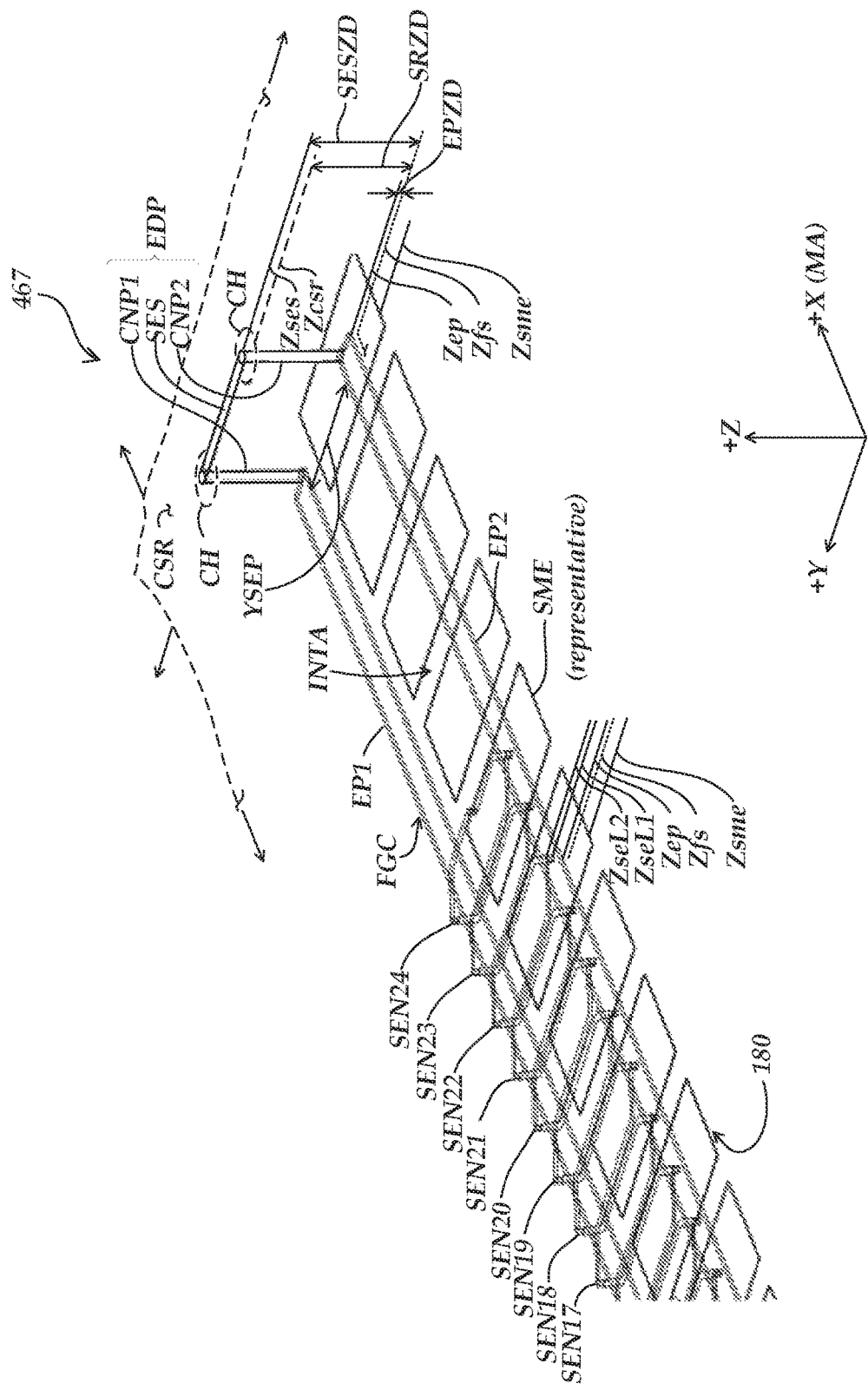
FIG. 4 is an isometric view diagram illustrating a first exemplary implementation of an end portion of a field generating coil of a detector portion.

In various implementations, the detector portion 167 is configured to be mounted proximate to the scale pattern 180, and to move along the measuring axis direction MA relative to the scale pattern 180. The detector portion includes a field generating coil FGC and a plurality of sensing elements, which may take a variety of alternative configurations to be used in combination with a variety of corresponding signal processing schemes in various embodiments, as will be understood by one skilled in the art. FIG. 2 shows a single representative set of sensing elements SEN1-SEN24, which in this particular embodiment comprise sensing loop elements (alternatively referred to as sensing coil elements or sensing winding elements) which are connected in series. In this embodiment, adjacent loop elements are connected by a configuration of conductors on various layers of PCB connected by feedthroughs according to known methods (e.g., as illustrated in FIG. 4) such that they have opposite winding polarities. That is, if a first loop responds to a changing magnetic field with a positive polarity detector signal contribution, then the adjacent loops respond with a negative polarity detector signal contribution. In this particular embodiment, the sensing elements are connected in series such that their detector signals or signal contributions are summed, and a "summed" detector signal is output at the detector signal output connections SDS1 and SDS2 to a signal processing configuration (not shown). Although FIG. 2 shows a single set of sensing elements to avoid visual confusion, it will be appreciated that in some embodiments it is advantageous to configure the detector to provide one or more additional sets of sensing elements at a different spatial phase position (e.g., to provide quadrature signals), as will be understood by one of ordinary skill in the art. However, it should be appreciated that the configurations of sensing elements described herein are exemplary only, and not limiting. As one example, individual sensing element loops may output individual signals to a corresponding signal processing configuration in some embodiments, for example, as disclosed in commonly assigned copending U.S. patent application Ser. No. 15/199,723, filed Jun. 30, 2016, which is hereby incorporated by reference in its entirety. More generally, various known sensing element configurations may be used in combination with the principles disclosed and claimed herein, for use in combination with various known scale pattern and signal processing schemes, in various embodiments.

The various sensing elements and the field generating coil FGC may be fixed on a substrate (e.g., substrate 162 of FIG. 1). The field generating coil FGC may be described as surrounding an interior area INTA having a nominal coil area length dimension NCALD along the x-axis direction and a nominal coil area width dimension of approximately YSEP along the y-axis direction. In various implementations, the field generating coil FGC may comprise a single turn surrounding the interior area INTA. In operation, the field generating coil FGC generates a changing magnetic flux in the interior area INTA in response to a coil drive signal.

In various implementations, the field generating coil FGC may include an input portion INP, first and second elongated portions EP1 and EP2, and an end portion EDP (e.g., implemented as disclosed with reference to FIGS. 4 and/or 5). The input portion INP includes first and second connection portions CP1 and CP2 that connect a coil drive signal from a signal processing configuration (e.g., the signal processing configuration 166 of FIG. 1, or the signal processing configuration 766 of FIG. 6, etc.) to the field generating coil FGC. The first and second connection portions CP1 and CP2 may be connected to the signal processing configuration through printed circuit board feedthroughs or the like, and the connections may also be shielded utilizing principles analogous to those disclosed below with reference to the end portion EDP, in some embodiments. The first and second elongated portions EP1 and EP2 each extend along the x-axis direction adjacent to a side of the interior area INTA, and have a nominal generating trace width dimension NGTWD along the y-axis direction. In the illustrated embodiment, the nominal generating trace width dimensions NGTWD are the same for EP1 and EP2, but this is not a requirement in all embodiments. The end portion EDP (e.g., implemented as disclosed with reference to FIGS. 4 and/or 5) spans the y-axis direction separation corresponding to the nominal coil width dimension YSEP between the first and second elongated portions EP1 and EP2 to provide a connection therebetween near an end of the interior area INTA. In various implementations according to principles disclosed herein, the field generating coil FGC is advantageously configured using a design ratio wherein each nominal generating trace width dimension NGTWD is at least 0.1 times the nominal coil area width dimension YSEP. In some implementations, the field generating coil FGC may be configured such that each nominal generating trace width dimension NGTWD is at least 0.15 times, or at least 0.25 times, or at least 0.50 times the nominal coil area width dimension YSEP. In some implementations, the field generating coil FGC may be configured such that each nominal generating trace width dimension NGTWD is at least 25 times the skin depth of the elongated portions EP1 and EP2 at a nominal operating frequency defined corresponding to detector signals that arise in response to the changing magnetic flux.

The sensing elements SEN1-SEN24 are arranged along the x-axis direction (e.g., corresponding to the measuring axis direction MA) and are fixed on the substrate (e.g., substrate 162 of FIG. 1). In the example of FIG. 2, each of the sensing elements SEN has a nominal sensing element width dimension NSEWD along the y-axis direction, wherein at least a majority of the nominal sensing element width dimension NSEWD is included within the nominal coil area width dimension YSEP along the y-axis direction. The sensing elements SEN are configured to provide detector signals which respond to a local effect on the changing magnetic flux provided by an adjacent signal modulating portion of the scale pattern 180 (e.g., one or more signal modulating elements SME) of the scale 170. A signal processing configuration (e.g., the signal processing configuration 166 of FIG. 1, or the signal processing configuration 766 of FIG. 6, etc.) may be configured to determine a position of the plurality of sensing elements SEN1-SEN24 relative to the scale 170 based on the detector signals input from the detector portion 167. In general, the field generating coil FGC and the sensing elements SEN1-SEN24, or the like, may operate according to known principles (e.g., for inductive encoders), such as those described in the incorporated references.

In various implementations, the field generating coil FGC and the sensing elements SEN are insulated from one another (e.g., as located in different layers of a printed circuit board, etc.). In one such implementation, the nominal sensing element width dimension NSEWD of at least one sensing element SEN is advantageously greater than the nominal coil area width dimension YSEP and extends beyond an interior edge IE of at least one of the elongated portions EP1 or EP2 by an amount defined as an overlap dimension OD. In addition, the field generating coil FGC may be advantageously configured such that each nominal generating trace width dimension NGTWD is larger than the corresponding overlap dimension OD, in various embodiments. In various implementations, the elongated portions EP1 and EP2 may be fabricated on a first layer of a printed circuit board, and the sensing elements SEN may comprise conductive loops fabricated in one or more layers of the printed circuit board that include a layer different than the first layer, at least in the vicinity of the overlap dimension OD.

In various implementations, the substrate may comprise a printed circuit board, and the field generating coil FGC may comprise conductive traces (e.g., including the elongated portions EP1 and EP2) fabricated on the printed circuit board. In various implementations, the sensing elements SEN may comprise magnetic flux sensing loops formed by conductive traces fabricated on the printed circuit board. As described above with respect to FIG. 1, in various implementations the detector portion 167 may be included in various types of measurement instruments (e.g., calipers, micrometers, gauges, linear scales, etc.). For example, the detector portion 167 may be fixed to a slide member, and the scale pattern 180 may be fixed to a beam member having a measuring axis that coincides with an x-axis direction. In such a configuration, the slide member may be movably mounted on the beam member and movable along the measuring axis direction MA in a plane that extends along the x-axis direction and a y-axis direction, with a z-axis direction being orthogonal to the plane.

Figure 3:
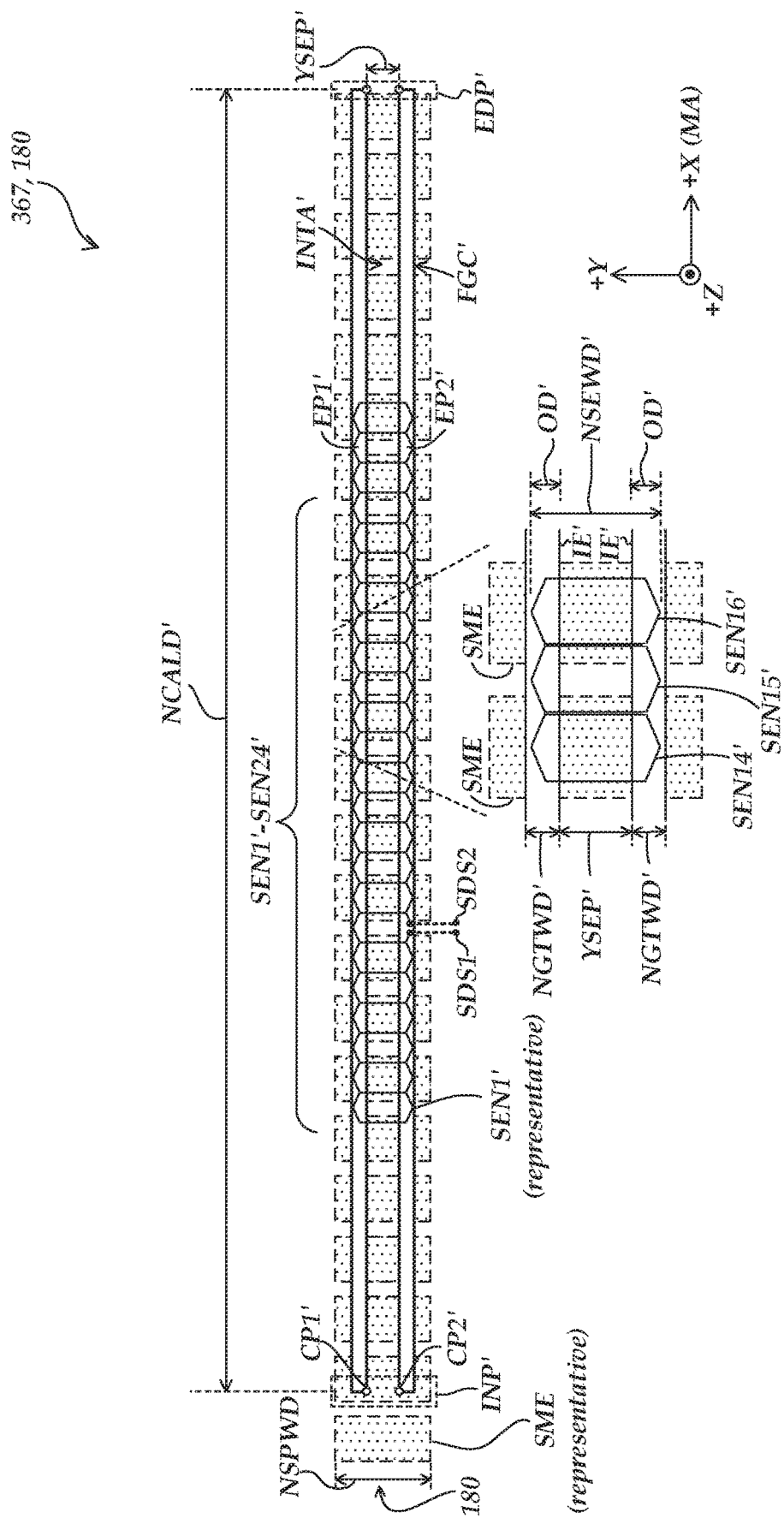
FIG. 3 is a plan view diagram illustrating a second exemplary implementation of a detector portion usable in an electronic position encoder.

FIG. 3 is a plan view diagram illustrating a second exemplary implementation of a detector portion 367 usable as the detector portion 167 in the electronic position encoder shown in FIG. 1, or the like. The detector portion 367 has characteristics and components similar to the detector portion 167 of FIG. 2, and its design and operation are configured to fulfill various design principles disclosed and claimed herein. In particular, the elements designated by "primed" reference numbers in FIG. 3 are analogous to elements having the corresponding similar "unprimed" reference numbers in FIG. 2, and may be understood to operate similarly, except as otherwise indicated below.

The primary difference between the embodiments of FIG. 3 and FIG. 2 is that the detector portion 367 is narrower than the detector portion 167 along the y-axis direction, such that the nominal scale pattern width dimension NSPWD is significantly larger than the nominal sensing element width dimension NSEWD' and other y-axis dimensions of the detector portion 367. For example, in one specific implementation, the nominal sensing element width dimension NSEWD' may be approximately ⅔ or less of the nominal scale pattern width dimension NSPWD. In various implementations, such configurations may result in a greater lateral offset tolerance with respect to a lateral movement of the detector portion 367 relative to the scale pattern 180.

Despite this difference, other features of the detector portion 367 may be analogous to those of the detector portion 167. For example, each of the sensing elements SEN' may have a nominal sensing element width dimension NSEWD' along the y-axis direction, wherein at least a majority of the nominal sensing element width dimension NSEWD' is included within the nominal coil area width dimension YSEP' along the y-axis direction. In various implementations, the field generating coil FGC' includes the first and second elongated portions EP1' and EP2', and an end portion EDP' (e.g., implemented as disclosed with reference to FIGS. 4 and/or 5), all of which may have analogous configurations to the corresponding elements of the detector portion 167. In some implementations, the field generating coil FGC' may be configured such that the nominal trace width dimension NGTWD' is at least 0.10 times, or at least 0.15 times, or at least 0.25 times, or at least 0.50 times the nominal coil area width dimension YSEP'. Other features and/or design relationships may also be made analogous to those described with reference to FIG. 2, if desired.

With respect to the example configurations of the detector portions 167 and 367 that are described above, it will be appreciated that certain prior systems utilized relatively narrower traces and/or relatively larger interior area (e.g., larger area INTA and/or nominal coil area width dimension YSEP) for field generating coils. More specifically, in certain prior systems it was generally considered to be desirable for the related detector portion elements to have a relatively high inductance such that the system would have a high enough Q to resonate for a relatively long period of time, as was considered advantageous with respect to the signal processing and measurement methods that were utilized. In contrast, in accordance with the principles disclosed herein, a wider trace width is utilized (e.g., at the expense of INTA and/or YSEP, for an overall detector y-axis dimension limit imposed by a particular application), which results in a relatively smaller inductance and also a smaller overall impedance, for which a greater amount of current is able to flow in a relatively shorter period of time (e.g., producing a stronger signal), and resonance is still able to be achieved for a desired length of time for a measurement. As noted above with respect to the detector portions 167 and 367, in various implementations, each nominal generating trace width dimension NGTWD is at least 0.10 times, or at least 0.15 times, or at least 0.25 times, or at least 0.50 times the nominal coil area width dimension YSEP. As some specific example values, in certain implementations, the nominal coil area width dimension YSEP may be on the order of 2.0 mm, or 8.0 mm, or 10 mm, and each nominal generating trace width dimension NGTWD may be on the order of at least approximately 0.25 mm, or 0.50 mm, or 1.00 mm, or larger. These may be compared with trace widths in certain prior systems that were on the order of 0.10 mm. Configurations such as those disclosed herein have been determined in some instances to achieve detector signal levels that exceed the signal levels of comparable prior art configurations by a factor of 1.5 or more, and in some instances by a factor of 3 or more, when inputting a comparable driving signal to the field generating coil.

With respect to the example configurations of the detector portions 167 and 367, and the like, in various implementations the sensing elements SEN (e.g., area-enclosing loop or coil elements as illustrated in FIGS. 2 and 3) may provide certain advantages (e.g., increased gain, etc.) over more conventional sensing elements, if they are configured in accordance with a maximum signal gain design principle disclosed here, wherein the amount of a sensing element field-receiving area coinciding with or located inside a field generating coil FGC (e.g., in INTA) should be relatively maximized, while the amount of sensing element field-receiving area located outside of the conductors that form a field generating coil FGC (e.g., along the y-axis direction) should be relatively minimized. It will be appreciated that the sensing elements SEN shown in FIGS. 2 and 3 exhibit an overlap dimension OD having design relationships outlined above which conform with this principle. For example, each nominal generating trace width dimension NGTWD is made to be larger than the corresponding overlap dimension OD.

FIG. 4 is an isometric view "wire frame" diagram illustrating a first exemplary implementation of an end portion EDP of a field generating coil FGC included in a detector portion 467, according to principles disclosed and claimed herein. It will be appreciated that the elements of the detector portion 467 may have be designed and operated similarly to the similarly numbered elements of the detector portion 167 of FIG. 2, and may be generally understood by analogy thereto. The detector portion 467 includes the field generating coil FGC and the plurality of sensing elements SEN1-SEN24 (representative sensing elements SEN17-SEN24 are illustrated in FIG. 4). The field generating coil FGC includes the first and second elongated portions EP1 and EP2 and the end portion EDP and is fixed on a substrate (e.g., substrate 162 of FIG. 1) and surrounds the interior area INTA.

In various implementations, the field generating coil FGC and the sensing elements SEN are insulated from one another, e.g., as located in different layers of a printed circuit board (the layer structure is not explicitly shown in FIG. 4). In FIG. 4, the various labeled Z coordinates may be understood to coincide with or identify respective surfaces of various printed circuit board (PCB) layers, although alternative fabrication methods may be used. The elements SME of the scale pattern 180 reside on a surface of the scale 170 (shown in FIG. 1), at a Z coordinate Zsme. It will be understood that the scale 170 is separate from the printed circuit board (PCB) that carries the elements of the detector portion 467. In the embodiment shown in FIG. 4, the PCB has a front surface (e.g., a front surface of an insulative coating) located at a Z coordinate Zfs. An operating gap exists between the scale element Z coordinate Zsme and the front surface Z coordinate Zfs. The elongated portions EP1 and EP2 may be fabricated on a PCB layer surface having a Z coordinate Zep, and they may be covered by the insulative coating. The sensing elements SEN may comprise interconnected conductive loop portions that reside on respective PCB layer surfaces having Z coordinates ZseL1 and ZseL2. The conductive loop portions may be connected between the layers using feedthroughs, such that the conductors may cross over one another while connecting the sensing elements signal contributions in a serial manner and providing respective signal contribution polarities, as previously outlined.

The first and second elongated portions EP1 and EP2 each extend along the x-axis direction and are nominally located at the elongated portion z distance EPZD=(Zep−Zsme) from the front surface of the PCB of the detector portion 467 that faces the scale pattern 180, along a z-axis direction that is perpendicular to the x-axis and y-axis directions. As noted above, the end portion EDP comprises a conductive path that spans a y-axis direction separation corresponding to the nominal coil area width dimension YSEP between the first and second elongated portions EP1 and EP2 to provide a connection therebetween near an end of the interior area INTA. In the embodiment shown in FIG. 4, the end portion EDP includes a shielded end section SES that resides on a respective PCB layer surface having a Z coordinate Zses, which is nominally located at a shielded end section z distance SESZD=(Zses−Zfs) from the front surface of the PCB of the detector portion 467, wherein the shielded end section z distance SESZD is greater than the elongated portion z distance EPZD. A first connection portion CNP1 (e.g., a PCB feedthrough) connects the first elongated portion EP1 to a first end of the shielded end section SES, and a second connection portion CNP2 (e.g., a PCB feedthrough) connects the second elongated portion EP2 to a second end of the shielded end section SES.

In the implementation shown in FIG. 4, the detector portion 467 further includes a conductive shield region CSR (e.g., a conductive plane region represented by somewhat arbitrarily placed dashed "edge" lines in FIG. 4), extending along the x-axis and y-axis directions and nominally located on a respective PCB layer surface having a Z coordinate Zcsr, which is nominally located at a shield region z distance SRZD=(Zcsr−Zfs) from the front surface of the PCB of the detector portion 467. In various implementations, the shield region z distance SRZD is smaller than the shielded end section z distance SESZD, and the conductive shield region CSR is located between at least part of the shielded end section SES and the front surface of the PCB of the detector portion 467. The conductive shield region CSR may comprise a portion of an extensive ground plane layer in the PCB of the detector portion 467, or it may comprise a discrete region in some embodiments. The conductive shield region CSR may include clearance holes such that the first and second connection portion CNP1 (e.g., PCB feedthroughs) are separated from or insulated from the conductive shield region CSR.

In general, the field components generated by the previously known configurations for the end portions of field generating coils (e.g., end portions that extend along the y-axis direction) have caused error components to arise in the detector signals of the sensing elements closest to them—a so-called "end effect". It has been attempted to mitigate this end effect using "tapered end configurations" in the detector, and/or by spacing the end portions far from the end sensing elements. However, these approaches undesirably reduce signal strength, or increase the detector x-axis dimension, or both. In contrast, the shielding configuration outlined above tends to reduce the field component generated by the end portions and/or prevent it from reaching the signal modulating elements SME. As such, the field component that is coupled to the closest sensing elements is smaller and/or approximately constant regardless of the scale position, thus substantially mitigating any end effect.

As indicated above, in various implementations, the elongated portions EP1 and EP2 may be fabricated on a first layer of a printed circuit board, the shielded end section SES may be fabricated on a second layer of the printed circuit board, and the conductive shield region CSR is fabricated on a layer of the circuit board that is closer to the front surface of the detector (e.g., the front surface of a PCB of the detector) than the second layer of the printed circuit board. In one such implementation, the conductive shield region CSR may be fabricated on a layer of the printed circuit board that is located between the first layer and the second layer. In such a configuration, the conductive shield region CSR may comprise at least a portion of a ground plane layer of the printed circuit board, wherein the ground plane layer is located between the first layer and the second layer. In one implementation, a connection (e.g., as part of the first or second connection portions CNP1 or CNP2) between an elongated portion EP1 or EP2 and the shielded end section SES may include a printed circuit board feedthrough that extends along the z-axis direction. In one such configuration, the conductive shield region CSR may be fabricated on a layer of the printed circuit board that is located between the first layer and the second layer, and the printed circuit board feedthrough may pass through an opening fabricated in the conductive shield region CSR.

Figure 5:
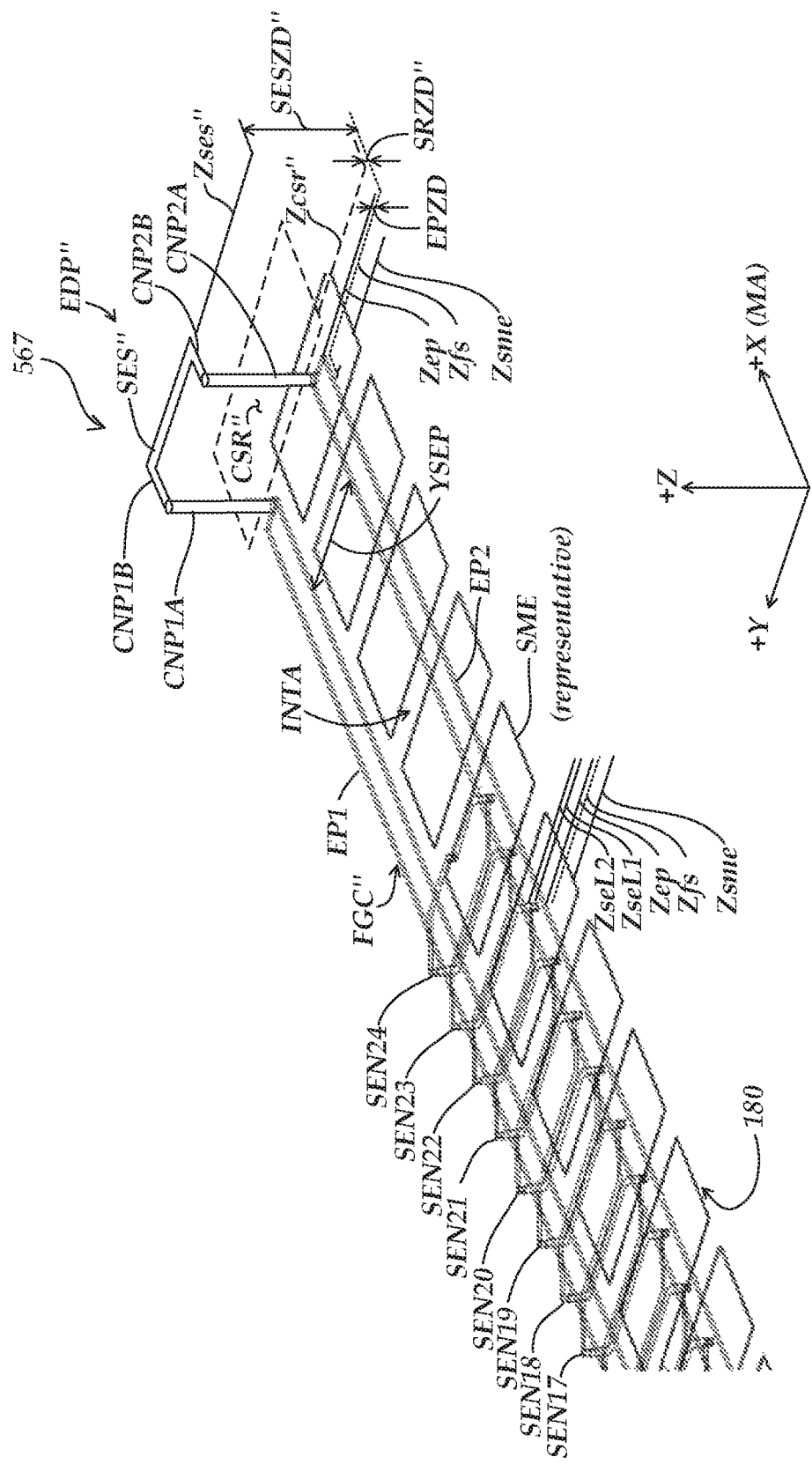
FIG. 5 is an isometric view diagram illustrating a second exemplary implementation of an end portion of a field generating coil of a detector portion.

FIG. 5 is an isometric view "wire frame" diagram illustrating a second exemplary implementation of an end portion EDP" of a field generating coil FGC" included in a detector portion 567, according to principles disclosed and claimed herein. It will be appreciated that the elements of the detector portion 567 may be designed and operated similarly to the similarly numbered elements of the detector portion 167 of FIG. 2, and/or the detector portion 467 of FIG. 4, and may be generally understood by analogy thereto.

In FIG. 5, as in FIG. 4, the various labeled Z coordinates may be understood to coincide with or identify respective surfaces of various printed circuit board (PCB) layers, although alternative fabrication methods may be used. The elements SME of the scale pattern 180 reside on a surface of the scale 170 (shown in FIG. 1), at a Z coordinate Zsme. The detector portion 567 has a front surface (e.g., a front surface of an insulative coating on a PCB of the detector portion 567) located at a Z coordinate Zfs. An operating gap exists between the scale element Z coordinate Zsme and the front surface Z coordinate Zfs. The elongated portions EP1 and EP2 may be fabricated on a PCB layer surface having a Z coordinate Zep, and may be covered by the insulative coating. The sensing elements SEN may comprise interconnected conductive loop portions that reside on respective PCB layer surfaces having Z coordinates ZseL1 and ZseL2, connected as previously outlined with reference to the detector portion 467.

The first and second elongated portions EP1 and EP2 are nominally located at the elongated portion z distance EPZD=(Zep−Zsme) from the front surface of the detector portion 567 that faces the scale pattern 180. As in the detector portion 467, the end portion EDP" comprises a conductive path that spans a y-axis direction separation corresponding to the nominal coil area width dimension YSEP between the first and second elongated portions EP1 and EP2 to provide a connection therebetween near an end of the interior area INTA. In the embodiment shown in FIG. 5, the end portion EDP" includes a shielded end section SES" that resides on respective PCB layer surface having a Z coordinate Zses", which is nominally located at a shielded end section z distance SESZD"=(Zses"–Zfs) from the front surface of the detector portion 567, wherein the shielded end section z distance SESZD" is greater than the elongated portion z distance EPZD. A first connection portion CNP1 (e.g., a comprising a PCB feedthrough CNP1A and a conductive trace CNP1B) connects the first elongated portion EP1 to a first end of the shielded end section SES, and a second connection portion CNP2 (e.g., comprising a PCB feedthrough CNP2A and a conductive trace CNP2B) connects the second elongated portion EP2 to a second end of the shielded end section SES.

In the implementation shown in FIG. 4, the detector portion 567 further includes a conductive shield region CSR" (e.g., a conductive plane region represented by dashed edge lines in FIG. 5), extending along the x-axis and y-axis directions and nominally located on respective PCB layer surface having a Z coordinate Zcsr", which is nominally located at a shield region z distance SRZD"=(Zcsr"–Zfs) from the front surface of the PCB of the detector portion 467. In various implementations, the shield region z distance SRZD" is smaller than the shielded end section z distance SESZD", and the conductive shield region CSR" is located between at least part of the shielded end section SES" and the front surface of the PCB of the detector portion 567. For the embodiment shown in FIG. 5, it should be appreciated that in some implementations the shield region CSR" may be located on the same surface as the elongated portions EP1 and EP2, if desired (that is, Zcsr"=Zep and EPZD=SRZD", if desired). Furthermore, in one such implementation, the shielded end section SES" and the conductive traces CNP1B and CNP2B may be located on the same surface(s) used for sensing elements SEN, if desired (that is, Zses"=ZseL1 or Zses"=ZseL2, and so on, if desired). In such implementations, a PCB of the detector portion 567 may comprise fewer layers and/or be thinner along the z-axis direction than the detector portion 467. In any case, the shielded configuration of the end portion EDP" in the detector portion 567 mitigates end effects in a manner analogous to that previously outlined with reference to the end portion EDP in the detector portion 467.

With respect to the example detector portions 467 and 567 described above, it will be appreciated that the conductive shield region(s) CSR (CSR") may reduce the effect (e.g., related to the changing magnetic flux) of the shielded end section SES on the sensing elements SEN, based at least in part on the relative layer location of the shielded end section SES (e.g., as located on a different PCB layer, etc.) as compared to the layer location of the elongated portions EP1 and EP2 of the field generating coil FGC. Such configurations may enable utilization of conductive shield region(s) CSR (CSR") and allow a shorter overall x-axis dimension for the field generating coil FGC (e.g., for which the end portion EDP does not need to be located as far away from the sensing elements SEN in order to avoid influencing the detector signals that arise in response to the changing magnetic flux, etc.).

Figure 6:
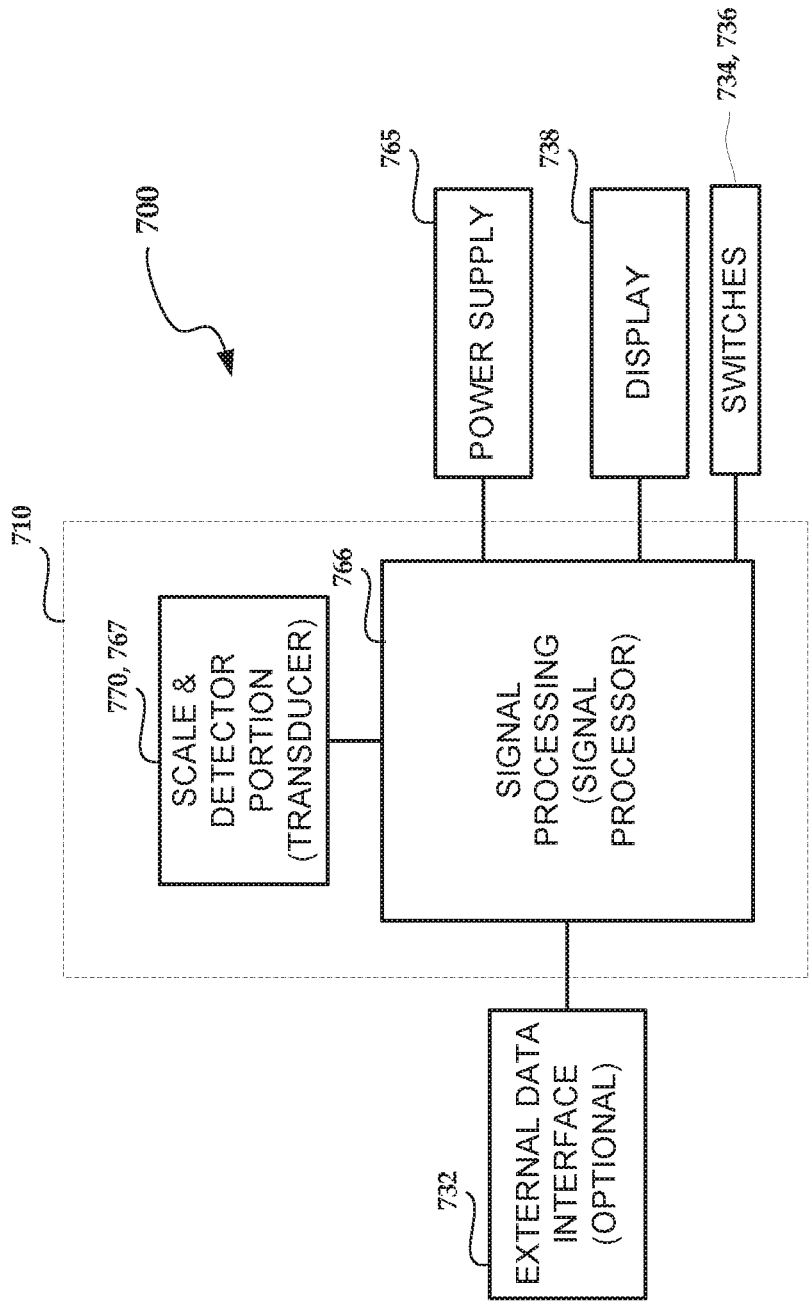
FIG. 6 is a block diagram illustrating one exemplary implementation of components of a measurement system including an electronic position encoder.

FIG. 6 is a block diagram illustrating one exemplary implementation of components of a measurement system 700 including an electronic position encoder 710. It will be appreciated that certain numbered components 7XX of FIG. 6 may correspond to and/or have similar operations as similarly numbered components 1XX of FIG. 1, except as otherwise described below. The electronic position encoder 710 includes a scale 770 and a detector portion 767, which together form a transducer, and a signal processing configuration 766. In various implementations, the detector portion 767 may include any of the configurations described above with respect to FIGS. 2-6, or other configurations. The measurement system 700 also includes user interface features such as a display 738 and user-operable switches 734 and 736, and may additionally include a power supply 765. In various implementations, an external data interface 732 may also be included. All of these elements are coupled to the signal processing configuration 766 (or signal processing and control circuit), which may be embodied as a signal processor. The signal processing configuration 766 determines a position of the sensing elements of the detector portion 767 relative to the scale 770 based on detector signals input from the detector portion 767.

In various implementations, the signal processing configuration 766 of FIG. 6 (and/or the signal processing configuration 166 of FIG. 1) may comprise or consist of one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

Figure 7:
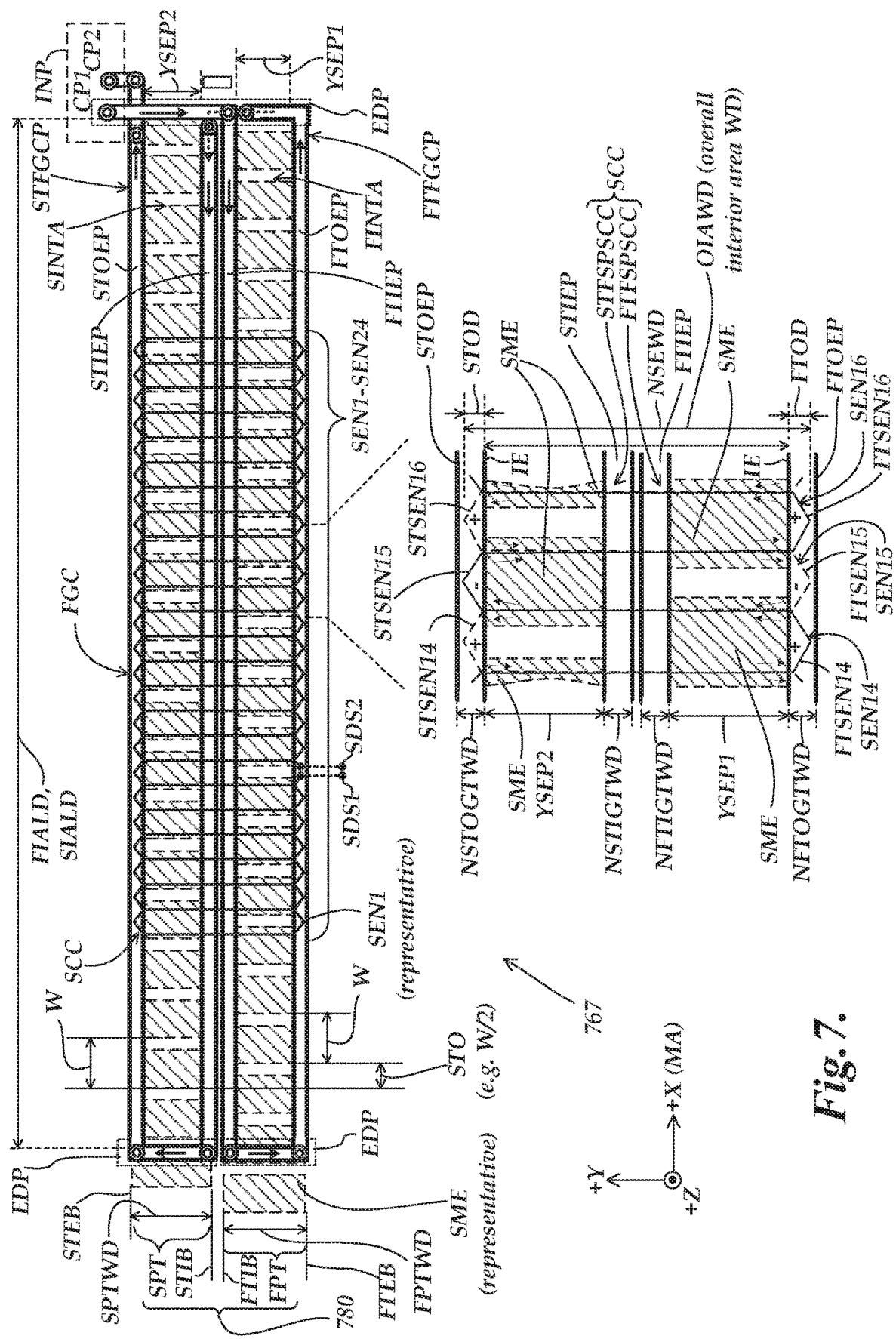
FIG. 7 is a plan view diagram illustrating a third exemplary implementation of a detector portion and a compatible scale pattern usable in an electronic position encoder.

FIG. 7 is a plan view diagram illustrating a third exemplary implementation of a detector portion 767 and a compatible scale pattern 780 usable as the detector portion 167 and the scale pattern 180, respectively, in the electronic position encoder shown in FIG. 1, or the like. The detector portion 767 has characteristics and components similar to the detector portion 167 of FIG. 2, and its design and operation are configured to fulfill various design principles disclosed and claimed herein. In particular, the elements designated by reference numbers or labels in FIG. 7 that are similar or identical to those in FIG. 2 or other figures herein (e.g., similar "XX" suffixes as in 7XX and 2XX) designate analogous elements, and may be understood to operate similarly, except as otherwise indicated below. Therefore, only the significant differences of the detector portion 767 and the scale pattern 780 will be described below. The detector portion 767 and a compatible scale pattern 780 provide additional advantages with regard to providing more robust signal accuracy and or signal strength in comparison to previously described implementations, as described in greater detail further below.

One primary difference between the embodiments of FIG. 7 and FIG. 2 is that the scale pattern 780 comprises a first pattern track FPT and a second pattern track SPT arranged parallel to one another. The first pattern track FPT has a nominal first pattern track width dimension FPTWD along the y-axis direction between a first track interior boundary FTIB that is closest to the other pattern track and a first track exterior boundary FTEB that is farthest from the other pattern track. The second pattern track SPT has a nominal second pattern track width dimension SPTWD along the y-axis direction between a second track interior boundary STIB that is closest to the other pattern track and a second track exterior boundary STEB that is farthest from the other pattern track. Each of the first and second pattern tracks FPT and STP comprise signal modulating elements SME that are arranged to provide a spatially varying characteristic which changes as a periodic function of position along the x-axis direction. In FIG. 7, the illustrated signal modulating elements SME having the crosshatched area may be considered to represent field attenuating elements that locally attenuate a changing magnetic flux to a relatively larger degree according to known principles (e.g., they may be conductive plates of a circuit board type scale, or raised areas of a metal bar type scale), and the spaces between the crosshatched signal modulating elements SME may be considered to represent field sustaining elements that locally attenuate a changing magnetic flux to a relatively smaller degree or locally enhance the changing magnetic flux according to known principles (e.g., they may be nonconductive regions of a circuit board type scale, or recessed areas of a metal bar type pattern).

Another primary difference is that the detector portion 767 is configured for compatible operation with the scale pattern 780. The detector portion 767 comprises a field generating coil configuration FGC, which may be fixed on a substrate and comprises a first-track field generating coil portion FTFGCP and a second-track field generating coil portion STFGCP. The field generating coil configuration FGC may comprise an input portion INP comprising at least two connection portions (e.g., CP1 and CP2) that connect a coil drive signal from a signal processing configuration to the field generating coil configuration FGC. In the field generating coil configuration FGC, the first-track field generating coil portion FTFGCP surrounds a first interior area FINTA aligned with the first pattern track FPT and has a nominal first interior area length dimension FIALD along the x-axis direction and a nominal first interior area width dimension YSEP1 along the y-axis direction and generates a changing first magnetic flux in the first interior area FINTA in response to a coil drive signal. Similarly, the second-track field generating coil portion STFGCP surrounds a second interior area SINTA aligned with the second pattern track SPT and has a nominal second interior area length dimension SIALD along the x-axis direction and a nominal second interior area width dimension YSEP2 along the y-axis direction and generates a changing second magnetic flux in the second interior area SINTA in response to a coil drive signal.

The detector portion 767 also comprises a plurality of sensing elements SEN (e.g., SEN1, SEN14) arranged along the x-axis direction and fixed on a substrate, each of the sensing elements SEN having a nominal sensing element width dimension NSEWD along the y-axis direction that spans the first and second interior areas FINTA and SINTA, wherein the plurality of sensing elements are configured to provide detector signals which respond to a local effect on the changing magnetic flux provided by adjacent signal modulating elements SME of the scale pattern 780. In various implementations, the plurality of sensing elements SEN comprise magnetic flux sensing loops and may be formed by conductive traces and feedthroughs fabricated on a printed circuit board. In various implementations (e.g., as shown in FIG. 7) magnetic flux sensing loops configured to provide a first sensing loop polarity (e.g., that responds to a changing magnetic flux of a first polarity to produce a current in first direction) are interleaved along the x-axis direction with magnetic flux sensing loops configured to provide a second sensing loop polarity opposite to the first sensing loop polarity (e.g., that responds to a changing magnetic flux opposite to the first polarity to produce a current in same direction). A signal processing configuration may be operably connected to the detector portion to provide the coil drive signal and determine the relative position between the detector portion and the scale pattern based on detector signals input from the illustrated sensing elements SEN (and from other non-illustrated sensing elements SEN provided at other spatial phase positions, according to known principles) of the detector portion 767, according to known methods.

As shown in FIG. 7, the field generating coil configuration FGC and the sensing elements SEN are advantageously configured according to principles previously disclosed herein. The field generating coil configuration FGC may include one or more of the illustrated feedthroughs to implement a shielded configuration for one or more of the end portions EDP. It will be understood that illustrated feedthroughs that are not needed or desired in a particular implementation may be omitted.

In the implementation shown in FIG. 7, the first-track inside and outside elongated portions FTIEP and FTOEP, respectively, extend along the x-axis direction adjacent to the first interior area FINTA. The first-track inside elongated portion FTIEP is located adjacent to the first-track interior boundary FTIB and the first-track outside elongated portion FTOEP is located adjacent to the first-track exterior boundary FTEB. The first-track inside elongated portion FTIEP has a nominal first-track inside generating trace width dimension NFTIGTWD along the y-axis direction. The first-track outside elongated portion FTOEP has a nominal first-track outside generating trace width dimension NFTOGTWD along the y-axis direction. According to principles disclosed herein, each of the nominal first-track generating trace width dimensions NFTIGTWD and NFTOGTWD (which may be the same, or different from each other) are at least 0.1 times the nominal first interior area width dimension YSEP1. In some implementations, it may be advantageous if the first-track generating trace width dimensions NFTIGTWD and NFTOGTWD are least 0.15 times, or at least 0.25 times, or at least 0.50 times the nominal first interior area width dimension YSEP1.

The second-track inside and outside elongated portions STIEP and STOEP, respectively, extend along the x-axis direction adjacent to the second interior area SINTA. The second-track inside elongated portion STIEP is located adjacent to the second-track interior boundary STIB and the second-track outside elongated portion STOEP is located adjacent to the second-track exterior boundary STEB. The second-track inside elongated portion STIEP has a nominal second-track inside generating trace width dimension NSTIGTWD along the y-axis direction. The second-track outside elongated portion STOEP has a nominal second-track outside generating trace width dimension NSTOGTWD along the y-axis direction. According to principles disclosed herein, each of the nominal second-track generating trace width dimensions NSTIGTWD and NSTOGTWD (which may be the same, or different from each other) are at least 0.1 times the nominal second interior area width dimension YSEP2. In some implementations, it may be advantageous if the second-track generating trace width dimensions NSTIGTWD and NSTOGTWD are least 0.15 times, or at least 0.25 times, or at least 0.50 times the nominal second interior area width dimension YSEP2. Other features and/or design relationships may also be made analogous to those described with reference to FIG. 2, if desired.

In various implementations, in combination with the features outlined above, at least a majority of the nominal sensing element width dimension NSEWD is included between the first-track outside elongated portion FTOEP and the second-track outside elongated portion STOEP. In some implementations, at least a majority of the nominal sensing element width dimension NSEWD is included within the first and second interior areas FINTA and SINTA. In various implementations, the field generating coil configuration FGC and the sensing elements SEN are insulated from one another. As illustrated in FIG. 7, the nominal sensing element width dimension NSEWD of at least one sensing element SEN is greater than an overall interior area width dimension OIAWD spanning between the first-track outside elongated portion FTOEP and the second-track outside elongated portion STOEP and extends beyond an interior edge IE of at least one of the first-track outside elongated portion FTOEP and the second-track outside elongated portion STOEP by an amount defined as an overlap dimension (e.g., the first track overlap dimension FTOD and/or the second track overlap dimension STOD, respectively). In various implementations, the field generating coil configuration FGC is configured such that each nominal outside generating trace width dimension (NFTOGTWD and NSTOGTWD) is larger than its associated overlap dimension. In various implementations, all elongated portions (FTIEP, FTOEP, STIEP and STOEP) are fabricated in a first layer of a printed circuit board, and the sensing elements SEN comprise conductive loops fabricated in one or more layers of the printed circuit board that include a layer different than the first layer, at least in a vicinity of the overlap dimensions.

In the particular implementation illustrated in FIG. 7, the first and second pattern tracks FPT and SPT may each comprise the same type of signal modulating elements SME arranged according to a same spatial period or wavelength W along the x-axis direction in the first and second pattern tracks FPT and SPT. The signal modulating elements SME in the second pattern track SPT are offset along the measuring axis direction (the X-axis direction) by a nominal scale track pattern offset STO of approximately W/2 relative to the signal modulating elements in the first pattern track. As indicated by the current flow arrows in FIG. 7, the field generating coil configuration FGC is configured to generate a first-track changing magnetic flux with a first polarity in the first interior area FINTA, and generate a second-track changing magnetic flux with a second polarity that is opposite to the first polarity in the second interior area SINTA.

As previously outlined, the plurality of sensing elements SEN may comprise magnetic flux sensing loops (alternatively referred to as sensing coils or sensing windings) alternating in sensing loop polarity along the x-axis direction, formed by conductive traces fabricated on a printed circuit board. In various embodiments, at least a majority of the magnetic flux sensing loops may span the first and second interior areas FINTA and SINTA along the y-axis direction. As illustrated in FIG. 7, the particular sensing element SEN14, for example, may be described as comprising a first track positive polarity winding (or winding portion) FTSEN14 and a second track positive polarity winding (or winding portion) STSEN14. The particular sensing element SEN15, for example, may be described as comprising a first track negative polarity winding (or winding portion) FTSEN15 and a second track negative polarity winding (or winding portion) STSEN15, and so on for the other sensing elements. The set or group of windings (or winding portions) aligned with the first (track) interior area FINTA provides one implementation of a first track first spatial phase sensing coil configuration FTFSPSCCF. The set or group of windings (or winding portions) aligned with the second (track) interior area SINTA provides one implementation of a second track first spatial phase sensing coil configuration STFSPSCCF. Together, the first and second track first spatial phase sensing coil configurations FTFSPSCCF and STFSPSCCF form an overall sensing coil configuration SCC configured such that, in cooperation with the scale pattern 780, all of the signal components arising in each of its windings or winding portions (e.g., FTSEN and STSEN) have the same spatial phase. That is, in this particular embodiment, each sensing element SEN comprises windings or winding portions that provide the same sensing loop polarity in the first and second interior areas FINTA and SINTA. Since the generated magnetic flux polarity within the first interior area FINTA is opposite to the generated magnetic flux polarity within the second interior area SINTA, this interacts with the pattern of signal modulating elements SME having the scale track pattern offset STO of approximately W/2 in the first and second track patterns FTP and STP to produce reinforcing signal contributions in each of the sensing elements SEN. It will be understood that additional sensing coil configurations SCC having different spatial phases may be similarly configured and added to the detector portion 767 according to known principles, and all of the resulting signals (e.g., quadrature signals) may be processed to provide a robust position measurement.

Figure 8:
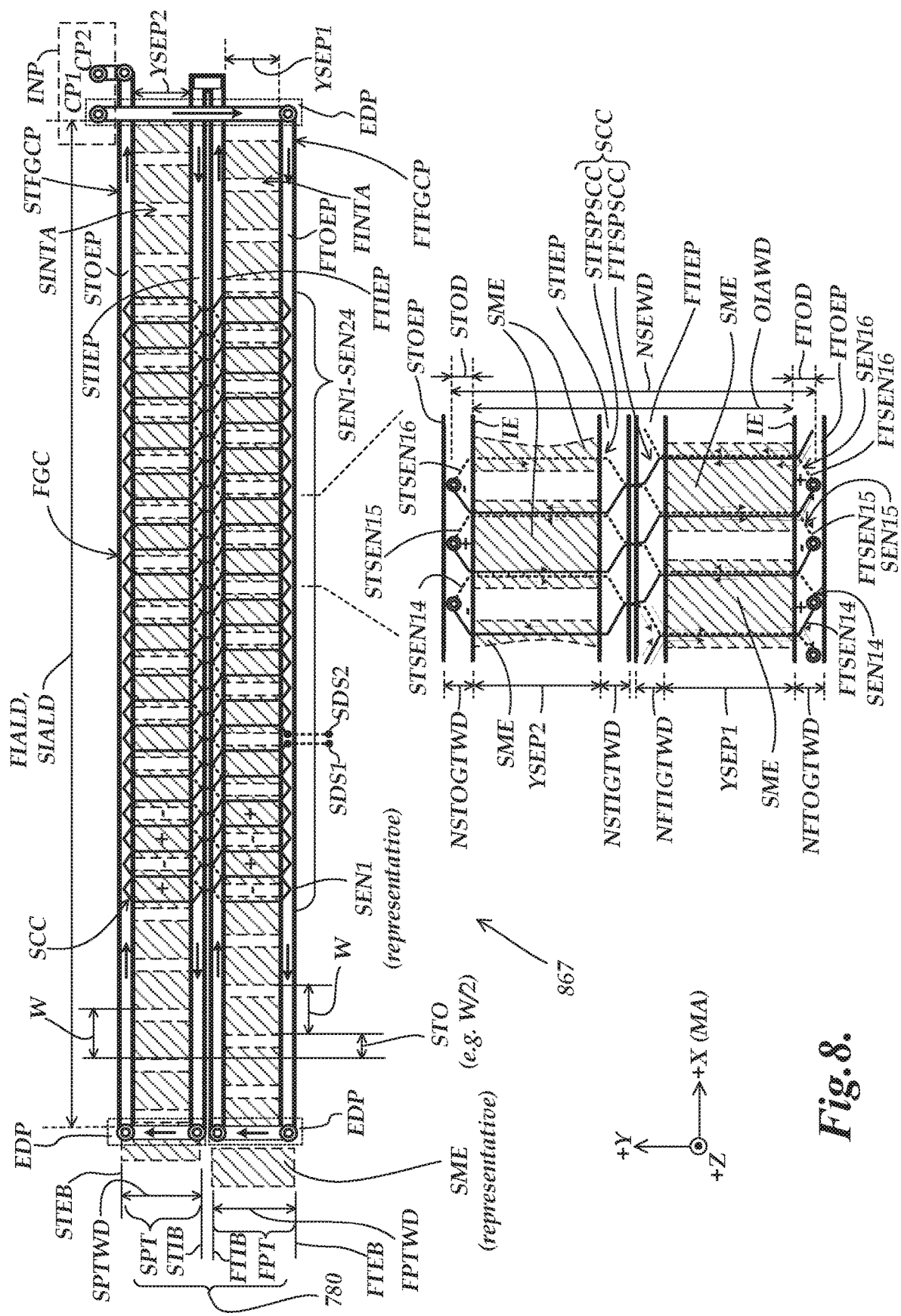
FIG. 8 is a plan view diagram illustrating a fourth exemplary implementation of a detector portion and a compatible scale pattern usable in an electronic position encoder.

FIG. 8 is a plan view diagram illustrating a fourth exemplary implementation of a detector portion 867 and a compatible scale pattern 780 usable as the detector portion 167 and the scale pattern 180, respectively, in the electronic position encoder shown in FIG. 1, or the like. The scale pattern 780 shown in FIG. 8 may be similar or identical to the scale pattern 780 shown in FIG. 7, and will not be described in greater detail below, except in relation to its operation with the detector portion 867. The detector portion 867 has characteristics and components analogous to those of the detector portion 767 of FIG. 7, and its design and operation are configured to fulfill similar design principles disclosed and claimed herein, and provide similar advantages. The elements designated by reference numbers or labels in FIG. 8 that are similar or identical to those in FIG. 7 or other figures herein (e.g., similar "XX" suffixes as in 8XX and 7XX) designate analogous elements, and may be understood to operate similarly, except as otherwise indicated below. Therefore, only the significant differences of the detector portion 867 and the detector portion 767 will be described in detail below.

Similarly to the detector portion 767, the detector portion 867 is configured for compatible operation with the scale pattern 780. The first-track field generating coil portion FTFGCP surrounds a first interior area FINTA aligned with the first pattern track FPT and has a nominal first interior area length dimension FIALD along the x-axis direction and a nominal first interior area width dimension YSEP1 along the y-axis direction and generates a changing first magnetic flux in the first interior area FINTA in response to a coil drive signal. Similarly, the second-track field generating coil portion STFGCP surrounds a second interior area SINTA aligned with the second pattern track SPT and has a nominal second interior area length dimension SIALD along the x-axis direction and a nominal second interior area width dimension YSEP2 along the y-axis direction and generates a changing second magnetic flux in the second interior area SINTA in response to a coil drive signal.

One significant difference between the detector portion 867 and the detector portion 767 is that, as indicated by the current flow arrows in FIG. 8, the field generating coil configuration FGC is configured to generate a first-track changing magnetic flux with a first polarity in the first interior area FINTA, and generate a second-track changing magnetic flux with a polarity that is the same as the first polarity in the second interior area SINTA. Related to this is a second significant difference, in the plurality of sensing elements SEN (e.g., SEN1, SEN14), as described below.

Similarly to the detector portion 767, in the detector portion 867 the plurality of sensing elements SEN have a nominal sensing element width dimension NSEWD along the y-axis direction that spans the first and second interior areas FINTA and SINTA, and the plurality of sensing elements SEN are configured to provide detector signals which respond to a local effect on the changing magnetic flux provided by adjacent signal modulating elements SME of the scale pattern 780. The plurality of sensing elements SEN may comprise magnetic flux sensing loops (alternatively referred to as sensing coils or sensing windings) formed by conductive traces fabricated on a printed circuit board. In various embodiments, at least a majority of the magnetic flux sensing loops may span the first and second interior areas FINTA and SINTA along the y-axis direction. However, in contrast to the detector portion 767, the magnetic flux sensing loops illustrated in the detector portion 867 each include a crossover or twisting of their conductive traces to provide opposite sensing loop polarities in the first interior area FINTA and second interior area SINTA. In various embodiments, for at least a majority of the magnetic flux sensing loops, the crossover or twisting of their conductive traces is located in or over an "inactive" central region including the first-track inside elongated portion FTIEP and second-track inside elongated portion STIEP between the first interior area FINTA and the second interior area SINTA, to avoid creating an undesirable signal disturbance.

As illustrated in FIG. 8, the particular sensing element SEN14, for example, may be described as comprising a first track positive polarity winding (or winding portion) FTSEN14 and a second track negative polarity winding (or winding portion) STSEN14. The particular sensing element SEN15, for example, may be described as comprising a first track negative polarity winding (or winding portion) FTSEN15 and a second track positive polarity winding (or winding portion) STSEN15, and so on for the other sensing elements. The set or group of windings (or winding portions) aligned with the first (track) interior area FINTA provides another implementation of a first track first spatial phase sensing coil configuration FTFSPSCCF. The set or group of windings (or winding portions) aligned with the second (track) interior area SINTA provides another implementation of a second track first spatial phase sensing coil configuration STFSPSCCF. As shown in FIG. 8, the magnetic flux sensing loops of the sensing elements SEN are furthermore configured to have opposite sensing loop polarities interleaved along the x-axis direction in each of the first track and second track first spatial phase sensing coil configurations FTFSPSCCF and STFSPSCCF (e.g., as schematically indicated by one exemplary sensing loop conductor diagram and the associated current flow arrows shown in the expanded section in the lower portion of FIG. 8.)

Together, the first and second track first spatial phase sensing coil configurations FTFSPSCCF and STFSPSCCF form an overall sensing coil configuration SCC configured such that, in cooperation with the scale pattern 780, all of the signal components arising in each of its windings or winding portions (e.g., FTSEN and STSEN) have the same spatial phase.

That is, according to the description above, since the generated magnetic flux polarity within the first interior area FINTA is the same as the generated magnetic flux polarity within the second interior area SINTA, this interacts with the signal modulating elements SME having the scale track pattern offset STO of approximately W/2 in the first and second track patterns FTP and STP to produce reinforcing signal contributions in each of the "twisted" sensing elements SEN. A signal processing configuration may be operably connected to the detector portion to provide the coil drive signal and determine the relative position between the detector portion and the scale pattern based on detector signals input from the illustrated sensing elements SEN (and from other non-illustrated sensing elements SEN provided at other spatial phase positions, according to known principles) of the detector portion 867, according to known methods.

As shown in FIG. 8, the field generating coil configuration FGC and the sensing elements SEN are advantageously configured according to principles previously disclosed herein. The field generating coil configuration FGC may include one or more of the illustrated feedthroughs to implement a shielded configuration for one or more of the end portions EDP. It will be understood that illustrated feedthroughs that are not needed or desired in a particular implementation may be omitted. According to principles disclosed herein, each of the nominal first-track generating trace width dimensions NFTIGTWD and NFTOGTWD are at least 0.1 times the nominal first interior area width dimension YSEP1. In some implementations, it may be advantageous if the first-track generating trace width dimensions NFTIGTWD and NFTOGTWD are least 0.15 times, or at least 0.25 times, or at least 0.50 times the nominal first interior area width dimension YSEP1. According to principles disclosed herein, each of the nominal second-track generating trace width dimensions NSTIGTWD and NSTOGTWD are at least 0.1 times the nominal second interior area width dimension YSEP2. In some implementations, it may be advantageous if the second-track generating trace width dimensions NSTIGTWD and NSTOGTWD are at least 0.15 times, or at least 0.25 times, or at least 0.50 times the nominal second interior area width dimension YSEP2.

Other features and/or design relationships used in the detector portion 867 may also be made analogous to compatible features and/or design relationships described with reference to the detector portion 767, if desired.

A two-track scale pattern used in combination with field generation polarities and sensing element polarities similar to those outlined above with reference to FIG. 7 and FIG. 8 may help reduce or eliminate certain signal offset components that may otherwise arise in single track scale pattern configurations, as disclosed without reference to detailed fabrication or layout consideration in the '958 patent, which was previously incorporated herein by reference. As previously indicated herein, prior systems (e.g., those referenced in the '958 patent) utilized relatively narrower traces and/or relatively larger interior area (e.g., larger interior areas FINTA and/or SINTA and/or nominal coil area width dimensions YSEP1 and/or YSEP2) for field generating coils. In certain prior systems it was generally considered to be desirable for the detector sensing elements to have a relatively large area coupled to receive the changing magnetic flux in a generating coil interior area, as was considered advantageous with respect to current flow and signal strength. In contrast, in accordance with the principles disclosed herein, a wider trace width is utilized (e.g., at the expense of the interior areas FINTA and/or SINTA and/or YSEP1 and/or YSEP2, for an overall detector y-axis dimension limit imposed by a particular application), which results in a relatively smaller overall impedance for the field generating coil configuration FGC, for which a greater amount of current is able to flow in a relatively shorter period of time (e.g., producing a stronger signal), and resonance is still able to be achieved for a desired length of time for a measurement. This is particularly valuable with respect to two-track scale patterns, which may be limited to relatively small first track pattern width and second track pattern width due to practical considerations (e.g., to fit into the same space as previously utilized single track encoders). Two-track configurations configured according to the principles disclosed herein have been determined in some instances to achieve detector signal levels that exceed the signal levels of comparable prior art configurations by a factor of 1.5 or more, and in some instances by a factor of 3 or more, when inputting a comparable driving signal to the field generating coil.

While preferred implementations have been illustrated and described with reference to FIGS. 1-8, numerous variations in the illustrated and described arrangements of features and sequences of operations will be apparent to one skilled in the art based on this disclosure. Various alternative forms may be used to implement the principles disclosed above.

As one example, the embodiments shown and described with reference to FIGS. 2 and 3, and FIGS. 7 and 8, utilize an overlap dimension OD which is non-zero, but this is not a requirement in all embodiments. As another example, the particular configurations of the sensing elements SEN and the scale track pattern offset STO illustrated in FIGS. 7 and 8 are exemplary only, and not limiting. Other scale track pattern offsets STO may be used in combination with suitable adaptations in the shape of the sensing elements SEN to accommodate a particular amount of scale track offset, as may be understood by one skilled in the art based on the description and principles disclosed above.

Figure 9:
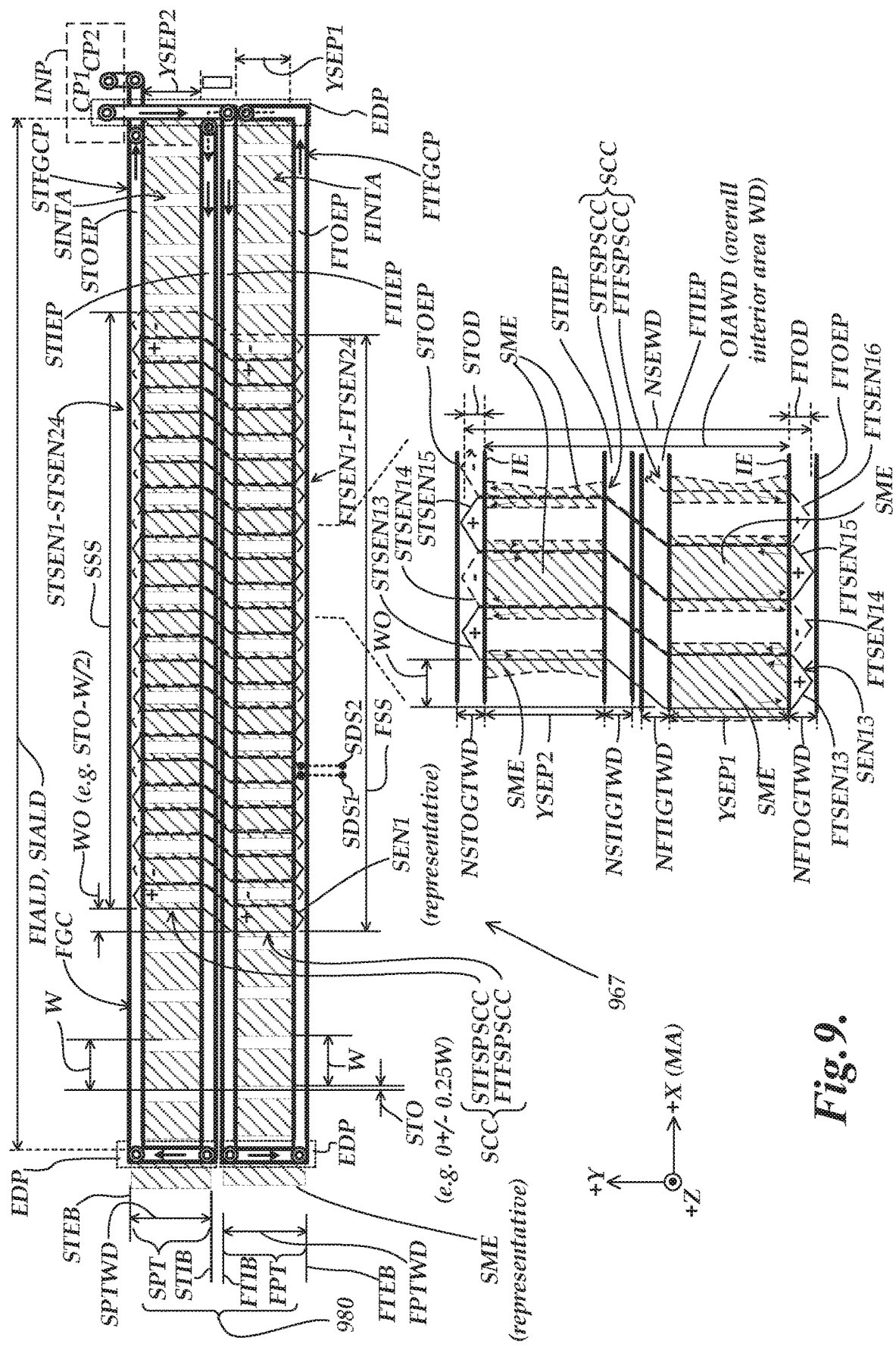
FIG. 9 is a plan view diagram illustrating a fifth exemplary implementation of a detector portion and a compatible scale pattern usable in an electronic position encoder.

FIG. 9 is a plan view diagram illustrating a fifth exemplary implementation of a detector portion 967 and a compatible scale pattern 980 usable in an electronic position encoder. The detector portion 967 has characteristics and components similar to the detector portion 767 of FIG. 7, and its design and operation are configured to fulfill various design principles disclosed and claimed herein. In particular, the elements designated by reference numbers or labels in FIG. 9 that are similar or identical to those in FIG. 7 or other figures herein (e.g., similar "XX" suffixes as in 9XX and 2XX) designate analogous elements, and may be understood to operate similarly, except as otherwise indicated below. Therefore, only the significant differences of the detector portion 967 and the scale pattern 980 will be described below. The detector portion 967 and a compatible scale pattern 980 provide certain advantages with regard to providing additional layout and fabrication options and reduced costs for the detector portion 967, as well as the ability to use readily available conventional scales in some embodiments. In addition, as described in greater detail below, the disclosed design principles and features also provide alternatives for overcoming position measurement errors arising from "dynamic pitch" effects due to certain mounting tilts or misalignments, as those explained in the previously incorporated '990 and '130 patents.

Similarly to the scale pattern 780, the scale pattern 980 comprises first and second pattern tracks FPT and SPT arranged parallel to one another, each pattern track comprising signal modulating elements SME which may comprise field attenuating elements that locally attenuate a changing magnetic flux to a relatively larger degree, and field sustaining elements that locally attenuate a changing magnetic flux to a relatively smaller degree or locally enhance the changing magnetic flux. The signal modulating elements SME (the field attenuating elements) and the field sustaining elements are interleaved along the x-axis direction in a periodic pattern that has a spatial wavelength W. However, one primary difference is that, in contrast to the scale pattern 780, in the scale pattern 980, the second pattern track SPT is not offset by a scale track pattern offset STO of approximately or precisely W/2 relative to the first pattern track. Rather, in the scale pattern 980, the periodic pattern of the second pattern track is aligned with or shifted along the x-axis direction relative the periodic pattern of the first pattern track by a scale track pattern offset STO that is not approximately or precisely 0.5*W. For example, the scale pattern offset STO may advantageously be within the range 0+/−0.25 W. In some embodiments, even more advantageously, the scale pattern offset STO may be zero, which corresponds to the configuration of a conventional scale. (In a conventional scale, the signal modulating elements are typically narrow rectangular elements or strips that extend across the full width of the scale pattern without interruption or discontinuity or offset.) Conventional scales may be more readily available, in various lengths, and at a lower cost than a special scale having multiple tracks having different patterns or offsets.

Similarly to the detector portion 767, the detector portion 967 is configured to be mounted proximate to the pattern tracks FPT and SPT and to move along the measuring axis direction relative to the pattern tracks FPT and SPT, and comprises a field generating coil configuration FGC and at least one respective sensing coil configuration SCC that provides signal components having a respective spatial phase. The field generating coil configuration FGC is described only briefly here. The field generating coil configuration FGC may be fixed on a substrate and comprises a first-track field generating coil portion FTFGCP configured to provide a changing first magnetic flux in the first interior area FINTA aligned with the first pattern track FPT in response to a coil drive signal, and a second-track field generating coil portion STFGCP configured to provide a changing second magnetic flux in the second interior area SINTA aligned with the second pattern track SPT, in response to a coil drive signal. In the detector portion 967, the second changing magnetic flux has a field polarity that is opposite to that of the first changing magnetic flux. The field generating coil configuration FGC may be advantageously configured according to previously outlined principles. However, such design principles are exemplary only and not limiting, in various implementations.

The sensing coil configuration SCC of the detector portion 967 may be similar to that of the detector portion 767 and may be similarly understood, except for certain differences described below.

Briefly summarizing some similar aspects, the sensing coil configuration SCC shown in FIG. 9 comprises sensing elements SEN that each comprise a first track winding or winding portion FTSEN and second track winding or winding portion STSEN. For example, SEN13 may be described as comprising a first track positive polarity winding (or winding portion) FTSEN13 and a second track positive polarity winding (or winding portion) STSEN13. The set or group of windings (or winding portions) FTSEN aligned with the first (track) interior area FINTA provides one implementation of a first track first spatial phase sensing coil configuration FTFSPSCCF. The set or group of windings (or winding portions) aligned with the second (track) interior area SINTA provides one implementation of a second track first spatial phase sensing coil configuration STFSPSCCF. Together, the first and second track first spatial phase sensing coil configurations FTFSPSCCF and STFSPSCCF form the overall sensing coil configuration SCC, and are configured such that, in cooperation with the scale pattern 980, all of the signal components arising in each of the windings or winding portions (e.g., FTSEN and STSEN) have the same spatial phase.

Regarding differences in comparison to the detector portion 767, the detector portion 967 includes certain added and/or altered features configured for compatible operation with the scale pattern 980, which has a different scale track pattern offset STO than the scale pattern 780. In particular, the first and second track first spatial phase sensing coil configurations FTFSPSCCF and STFSPSCCF are arranged according to a winding offset WO=STO+/−0.5*W along the x-axis direction, where STO is the particular scale track pattern offset STO that is used for a particular implementation of the scale pattern 980. As previously outlined for the embodiment shown in FIG. 9, the scale track pattern offset STO is never 0.5*W, and is advantageously within the range 0+/−0.25 W (e.g., as shown in FIG. 9), and even more advantageously may be zero. As may be seen in the embodiment shown in FIG. 9, the first track first spatial phase signal sensing coil configuration FTFSPSCCF and the second track first spatial phase signal sensing coil configuration STFSPSCCF define first and second sensing spans FSS and SSS, respectively, along the x-axis direction. In contrast to previous embodiments, the first and second sensing spans FSS and SSS are not aligned with one another along the x-axis direction, and are not symmetrically located to one another with respect to a border line along the x-axis direction between the first and second pattern tracks FPT and SPT. Instead, their spans FSS and SSS are offset from one another by the winding offset WO. In the particular implementation shown in the lower part of FIG. 9, the first track winding FTSEN is offset from the second track winding STSEN by WO in each of the sensing elements SEN.

In the particular implementation shown in FIG. 9, each of the first track and second track first spatial phase sensing coil configurations FTFSPSCCF and STFSPSCCF are configured to provide the same number of positive polarity and negative polarity windings (winding portions), interleaved without interruption along the x-axis direction. However, the '990 and '130 patents explain pitch compensation in terms of hypothetical interleaved positive polarity zones and negative polarity zones in sensing coil configurations. Various pitch compensated sensing coil configurations may have equal numbers of positive and negative polarity windings, but the windings need not be distributed in each polarity zone. For example, one positive polarity zone may include two positive polarity windings, and another positive polarity zone may be empty, in some pitch balanced configurations. Such principles may be combined with various principles and features disclosed herein. Therefore, the particular uninterrupted and uniform first track and second track first spatial phase sensing coil configurations FTFSPSCCF and STFSPSCCF shown in FIG. 9 are exemplary only, and not limiting. More generally, a first track first spatial phase signal sensing coil configuration FTFSPSCC arranged in the first interior area FINTA may comprise a set of N positive polarity windings distributed in positive polarity winding zones that repeat along the x-axis direction corresponding to the spatial wavelength W, and a set of N negative polarity windings distributed in negative polarity winding zones that alternate with the positive polarity winding zones and repeat along the x-axis direction corresponding to the spatial wavelength W, wherein N is an integer that is at least 2. The positive and negative polarity windings (e.g., FTSEN1-FTSEN24) are each configured to respond to a local effect on the changing magnetic flux provided by adjacent field attenuating elements (e.g., the signal modulating elements SME) or field sustaining elements and provide signal contributions to a first track first spatial phase signal component provided by the first track first spatial phase signal sensing coil configuration FTFSPSCCF (e.g., at the detector signal output connections SDS1 and SDS2). Similarly, a second track first spatial phase signal sensing coil configuration STFSPSCCF arranged in the second interior area SINTA, may comprise a set of M positive polarity windings distributed in positive polarity winding zones that repeat along the x-axis direction corresponding to the spatial wavelength W, and a set of M negative polarity windings distributed in negative polarity winding zones that alternate with the positive polarity winding zones and repeat along the x-axis direction corresponding to the spatial wavelength W, where M is an integer that is at least 2. The positive and negative polarity windings (e.g., STSEN1-STSEN24) are each configured to respond to a local effect on the changing magnetic flux provided by adjacent field attenuating elements (e.g., the signal modulating elements SME) or field sustaining elements and provide signal contributions signal contributions to a second track first spatial phase signal component provided by the second track first spatial phase signal sensing coil configuration STFSPSCCF (e.g., at the detector signal output connections SDS1 and SDS2). In various embodiments, it is advantageous if N=M. However, it is not strictly necessary in some embodiments.

It will be appreciated that in the particular embodiment shown in FIG. 9, each sensing element SEN comprises windings or winding portions FTSEN and STSEN which have the winding offset WO=STO+/−0.5*W and provide the same sensing loop polarity in the first and second interior areas FINTA and SINTA. Since the generated magnetic flux polarity within the first interior area FINTA is opposite to the generated magnetic flux polarity within the second interior area SINTA, this interacts with the pattern of signal modulating elements SME having the scale track pattern offset STO in the first and second track patterns FTP and STP of the scale pattern 980 to produce reinforcing signal contributions in each of the sensing elements SEN. In addition, it should be appreciated that proceeding along the sensing coil configuration SCC from a starting end (e.g., the left end in FIG. 9), the first track first spatial phase signal sensing coil configuration FTFSPSCCF has a configuration wherein its starting end winding (e.g., FTSEN1) along the first track FPT has a first winding polarity (e.g., a positive polarity), and the second track first spatial phase signal sensing coil configuration STFSPSCCF has a configuration wherein its starting end winding (e.g., STSEN1) along the second track SPT also has the first winding polarity (e.g., the positive polarity), and the starting end windings along the first and second tracks are offset from one another by the winding offset WO=STO+/−0.5*W along the x-axis direction. This particular feature is important for compensating or eliminating signal offset components that may otherwise arise due to static or dynamic "pitch" misalignment of the detector portion 967 relative to the scale pattern 980. Pitch misalignment refers to the detector portion 967 tilting to an angle rotated about the Y axis such that it is not parallel to the plane of the scale pattern 980. The inventor has discovered that in addition to the pitch compensation considerations disclosed in the '990 and/or '130 patents, another consideration not previously appreciated relates to subtle differences in the effects of the field attenuating elements and field sustaining elements of a scale pattern (e.g., the scale patterns 780 or 980). A sensing coil configuration SCC configured according to the principles outlined above addresses this pitch compensation consideration, in addition to the other different previously known pitch compensation considerations.

Figure 10:
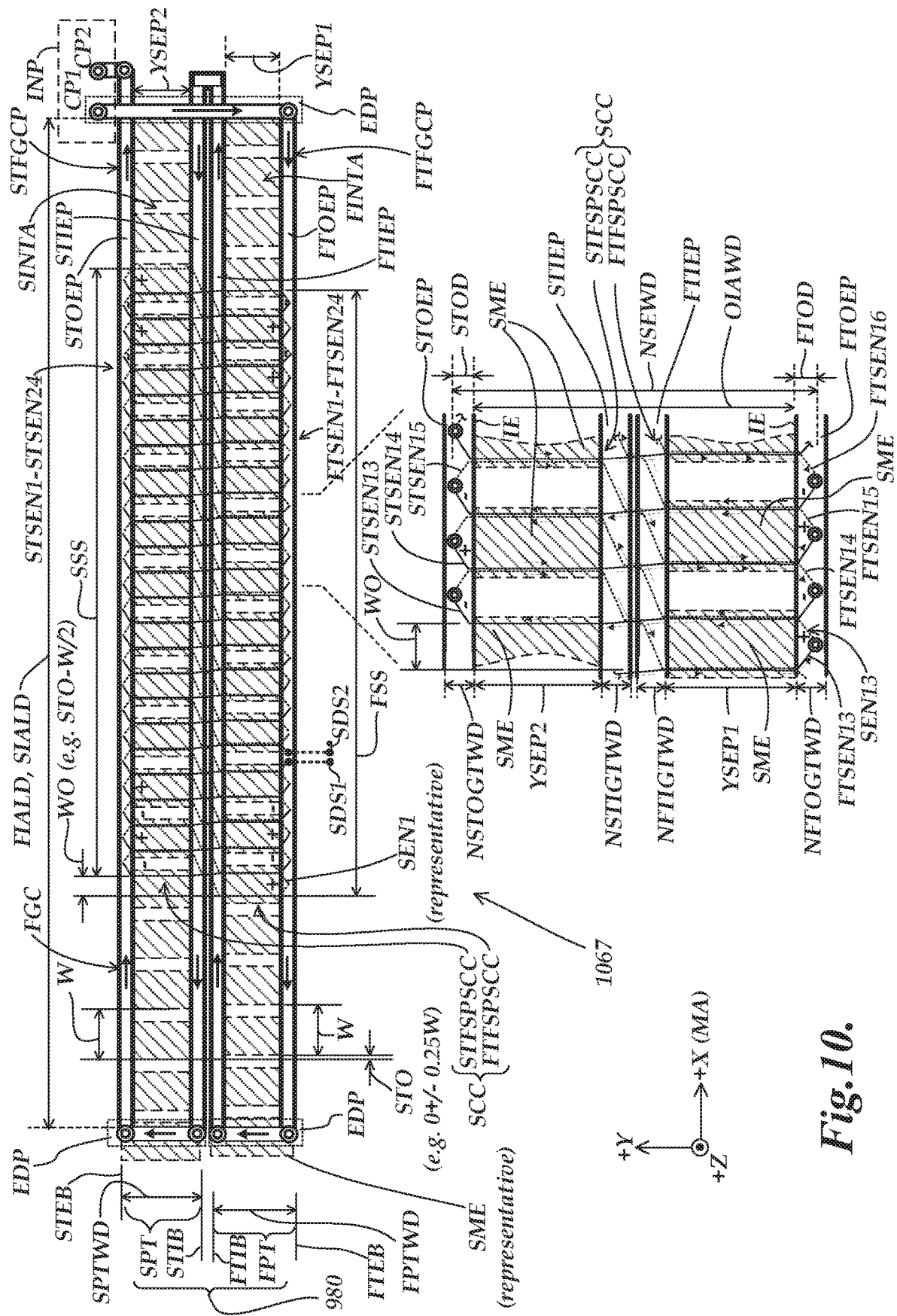
FIG. 10 is a plan view diagram illustrating a sixth exemplary implementation of a detector portion and a compatible scale pattern usable in an electronic position encoder.

FIG. 10 is a plan view diagram illustrating a sixth exemplary implementation of a detector portion 1067 that is also compatible with the previously described scale pattern 980. The detector portion 1067 has characteristics and components similar to the detector portion 867 of FIG. 8, as well as the detector portion 967 of FIG. 9, and its design and operation are configured to fulfill various design principles disclosed and claimed herein. In particular, the elements designated by reference numbers or labels in FIG. 10 that are similar or identical to those in FIG. 8 and/or FIG. 9, or other figures herein, designate analogous elements, and may be understood to operate similarly, except as otherwise indicated below. Therefore, only the significant differences of the detector portion 1067 will be described below. The detector portion 1067, in combination with the scale pattern 980, provides certain advantages similar to those previously outlined with reference to the detector portion 967.

Similarly to the detector portions 867 and 967, the detector portion 1067 is configured to be mounted proximate to the pattern tracks FPT and SPT and to move along the measuring axis direction relative to the pattern tracks FPT and SPT, and comprises a field generating coil configuration FGC and at least one respective sensing coil configuration SCC that provides signal components having a respective spatial phase. The field generating coil configuration FGC is described only briefly here. The field generating coil configuration FGC may be fixed on a substrate and in the illustrated embodiment comprises a first-track field generating coil portion FTFGCP and a second-track field generating coil portion STFGCP configured to provide changing magnetic flux of the same polarity in the first interior area FINTA along the first pattern track FPT and the second interior area SINTA along the second pattern track SPT. The field generating coil configuration FGC may be advantageously configured according to previously outlined principles. However, such design principles are exemplary only and not limiting, in various implementations. In some implementations, because the first-track field generating coil portion FTFGCP and a second-track field generating coil portion STFGCP provide the same changing magnetic flux polarity, a single winding surrounding the sensing coil configuration SCC may be considered to provide both "coil portions" without the need to use the first and second second-track inside elongated portions FTIEP and STIEP.

Such a configuration may not provide certain previously outlined advantages, but it may be sufficient in some implementations.

The sensing coil configuration SCC of the detector portion 1067 may be similar to that of the detector portion 867 and may be similarly understood, except for certain differences described below.

Briefly summarizing some similar aspects, the sensing coil configuration SCC shown in FIG. 10 comprises sensing elements SEN that each comprise a first track winding or winding portion FTSEN and second track winding or winding portion STSEN. For example, SEN13 may be described as comprising a first track positive polarity winding (or winding portion) FTSEN13 and a second track negative polarity winding (or winding portion) STSEN13. The set or group of windings (or winding portions) FTSEN aligned with the first (track) interior area FINTA provides one implementation of a first track first spatial phase sensing coil configuration FTFSPSCCF. The set or group of windings (or winding portions) aligned with the second (track) interior area SINTA provides one implementation of a second track first spatial phase sensing coil configuration STFSPSCCF. Together, the first and second track first spatial phase sensing coil configurations FTFSPSCCF and STFSPSCCF form the overall sensing coil configuration SCC, and are configured such that, in cooperation with the scale pattern 980, all of the signal components arising in each of the windings or winding portions (e.g., FTSEN and STSEN) have the same spatial phase.

Regarding differences in comparison to the detector portion 867, the detector portion 1067 includes certain added and/or altered features configured for compatible operation with the scale pattern 980, which has a different scale track pattern offset STO than the scale pattern 780. In particular, the first and second track first spatial phase sensing coil configurations FTFSPSCCF and STFSPSCCF are arranged according to a winding offset WO=STO+/−0.5*W along the x-axis direction, which may be understood according to principles previously described in relation to the winding offset WO in the detector portion 967. As previously outlined, the scale track pattern offset STO for the scale pattern 980 is never 0.5*W, and is advantageously within the range 0+/−0.25 W, and even more advantageously may be zero. For compatibility with such scale patterns 980, in the detector portion 1067, the first and second sensing spans FSS and SSS are not aligned with one another along the x-axis direction, and are not symmetrically located to one another with respect to a border line along the x-axis direction between the first and second pattern tracks FPT and SPT. Instead, their spans FSS and SSS are offset from one another by the winding offset WO. In the particular implementation shown in the lower part of FIG. 9, the first track winding FTSEN is offset from the second track winding STSEN by WO in each of the sensing elements SEN.

In the particular implementation shown in FIG. 10, each of the first track and the second track first spatial phase sensing coil configurations FTFSPSCCF and STFSPSCCF are configured to provide the same number of positive polarity and negative polarity windings (winding portions), interleaved without interruption along the x-axis direction. However, for reasons previously outlined with reference to the detector portion 967, the particular uninterrupted and uniform first track and second track first spatial phase sensing coil configurations FTFSPSCCF and STFSPSCCF shown in FIG. 10 are exemplary only, and not limiting. More generally, a first track first spatial phase signal sensing coil configuration FTFSPSCC arranged in the first interior area FINTA may comprise a set of N positive polarity windings distributed in positive polarity winding zones that repeat along the x-axis direction corresponding to the spatial wavelength W, and a set of N negative polarity windings distributed in negative polarity winding zones that alternate with the positive polarity winding zones and repeat along the x-axis direction corresponding to the spatial wavelength W, wherein N is an integer that is at least 2. The positive and negative polarity windings (e.g., FTSEN1-FTSEN24) are each configured to respond to a local effect on the changing magnetic flux provided by adjacent field attenuating elements (e.g., the signal modulating elements SME) or field sustaining elements and provide signal contributions to a first track first spatial phase signal component provided by the first track first spatial phase signal sensing coil configuration FTFSPSCCF (e.g., at the detector signal output connections SDS1 and SDS2). Similarly, a second track first spatial phase signal sensing coil configuration STFSPSCCF arranged in the second interior area SINTA, may comprise a set of M positive polarity windings distributed in positive polarity winding zones that repeat along the x-axis direction corresponding to the spatial wavelength W, and a set of M negative polarity windings distributed in negative polarity winding zones that alternate with the positive polarity winding zones and repeat along the x-axis direction corresponding to the spatial wavelength W, where M is an integer that is at least 2. The positive and negative polarity windings (e.g., STSEN1-STSEN24) are each configured to respond to a local effect on the changing magnetic flux provided by adjacent field attenuating elements (e.g., the signal modulating elements SME) or field sustaining elements and provide signal contributions signal contributions to a second track first spatial phase signal component provided by the second track first spatial phase signal sensing coil configuration STFSPSCCF (e.g., at the detector signal output connections SDS1 and SDS2). In various embodiments, it is advantageous if N=M. However, it is not strictly necessary in some embodiments.

It will be appreciated that in the particular embodiment shown in FIG. 9, each sensing element SEN comprises windings or winding portions FTSEN and STSEN which have the winding offset WO=STO+/−0.5*W and provide the opposite sensing loop polarity in the first and second interior areas FINTA and SINTA. Since the generated magnetic flux polarity within the first interior area FINTA is the same as generated magnetic flux polarity within the second interior area SINTA, this interacts with the pattern of signal modulating elements SME having the scale track pattern offset STO in the first and second track patterns FTP and STP of the scale pattern 980 to produce reinforcing signal contributions in each of the sensing elements SEN. In addition, it should be appreciated that proceeding along the sensing coil configuration SCC from a starting end (e.g., the left end in FIG. 10), the first track first spatial phase signal sensing coil configuration FTFSPSCCF has a configuration wherein its starting end winding (e.g., FTSEN1) along the first track FPT has a first winding polarity (e.g., a positive polarity), and the second track first spatial phase signal sensing coil configuration STFSPSCCF has a configuration wherein its starting end winding (e.g., STSEN1) along the second track SPT has a second winding polarity that is opposite to the first winding polarity (e.g., the negative polarity), and the starting end windings along the first and second tracks are offset from one another by the winding offset WO=STO+/−0.5*W along the x-axis direction. According to principles previously outlined with reference to the detector portion 967, this particular feature is important for compensating or eliminating signal offset components that may otherwise arise due to static or dynamic "pitch" misalignment of the detector portion 1067 relative to the scale pattern 980.

Figure 11:
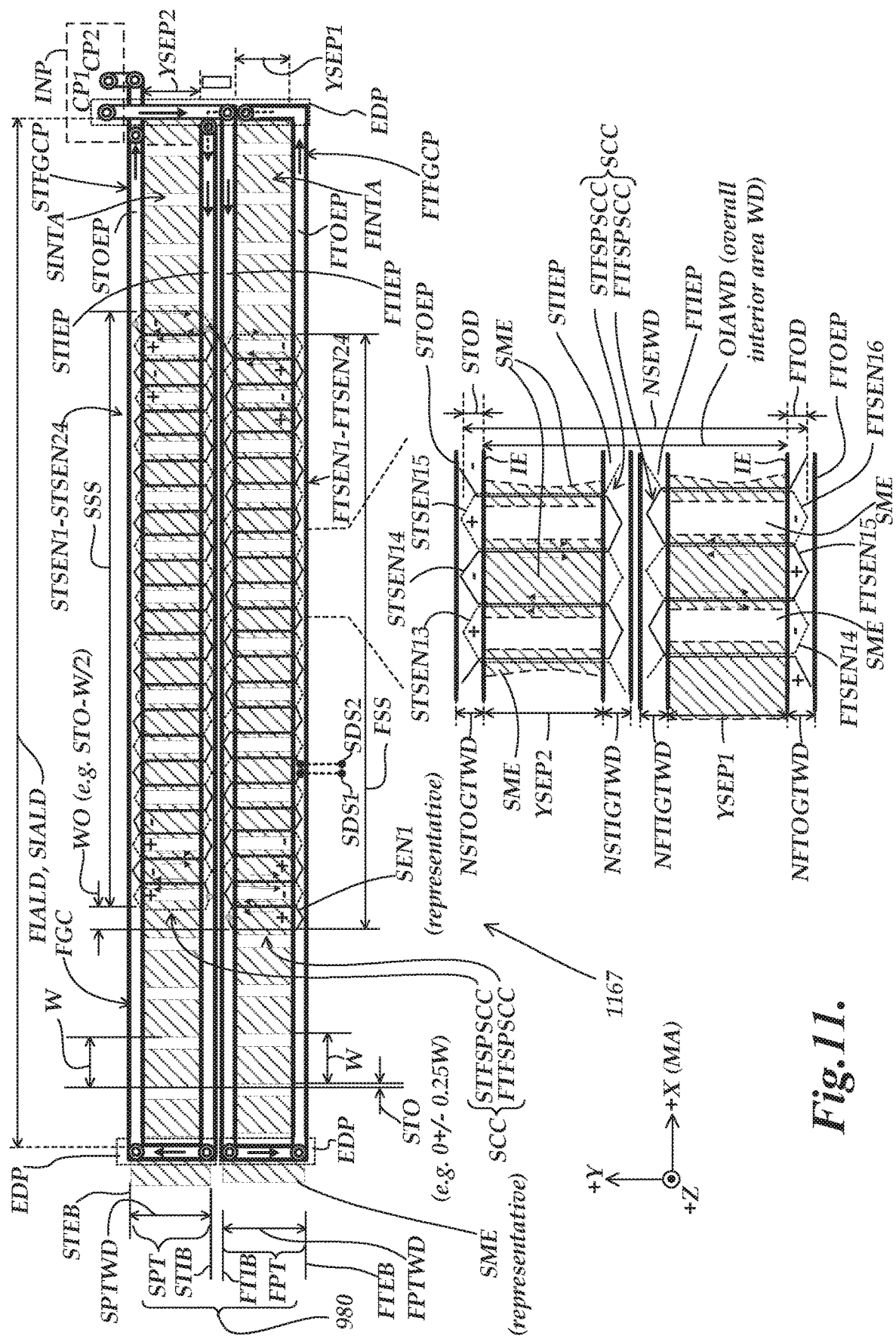
FIG. 11 is a plan view diagram illustrating a seventh exemplary implementation of a detector portion and a compatible scale pattern usable in an electronic position encoder.

FIG. 11 is a plan view diagram illustrating a seventh exemplary implementation of a detector portion 1167 that is functionally analogous to the detector portion 967 and that is also compatible with the previously described scale pattern 980. Elements designated by reference numbers or labels in FIG. 11 that are similar or identical to those in FIG. 9 designate analogous elements, and may be understood to operate similarly. The detector portion 1167 and a compatible scale pattern 980 provide certain advantages similar to those previously described for the detector portion 967.

The field generating coil configuration FGC of the detector portion 1167 may be similar or identical to that of the detector portion 967. Only significant differences of the detector portion 1167 in comparison to the detector portion 967 will be described below.

In the detector portion 967, the sensing coil configuration SCC comprised first track windings FTSEN and second track windings STSEN, that were provided in pairs, as portions of a corresponding sensing loop referred to as a sensing element SEN. In one manner of describing this arrangement, in the detector portion 967 first track windings FTSEN located in a respective winding zone of the first track first spatial phase signal sensing coil configuration FTFSPSCC comprise first and second conductor segments that are aligned transverse to the x-axis direction in the first interior area FINTA. The first conductor segment is serially connected through a first serial connection to output a sensing current directly to a conductor segment (e.g., of a second track winding portion STSEN) that is aligned transverse to the x-axis direction in the second interior area SINTA to form a portion of a winding (e.g., of a second track winding portion STSEN) of the second track first spatial phase signal sensing coil configuration STFSPSCC. Furthermore, the second conductor segment is serially connected through a second serial connection to input a sensing current directly from a conductor segment (e.g., of a second track winding portion STSEN) that is aligned transverse to the x-axis direction in the second interior area SINTA to form a portion of a winding (e.g., of a second track winding portion STSEN) of the second track first spatial phase signal sensing coil STFSPSCC.

In contrast, in the detector portion 1167, the sensing coil configuration SCC comprises first track windings FTSEN and second track windings STSEN, that are provided "separately" in the first and second track first spatial phase signal sensing coil configurations FTFSPSCC and STFSPSCC, which are serially connected only at their ends to the right in FIG. 11, as illustrated. One exemplary configuration for the conductors used to provide the first and second track first spatial phase signal sensing coil configurations FTFSPSCC and STFSPSCC is shown at the bottom of FIG. 11. Otherwise, it will be understood that the detector portion 1167 has similar configuration features provided according to principles previously outlined with reference to the detector portion 967, and provides similar advantages.

Figure 12:
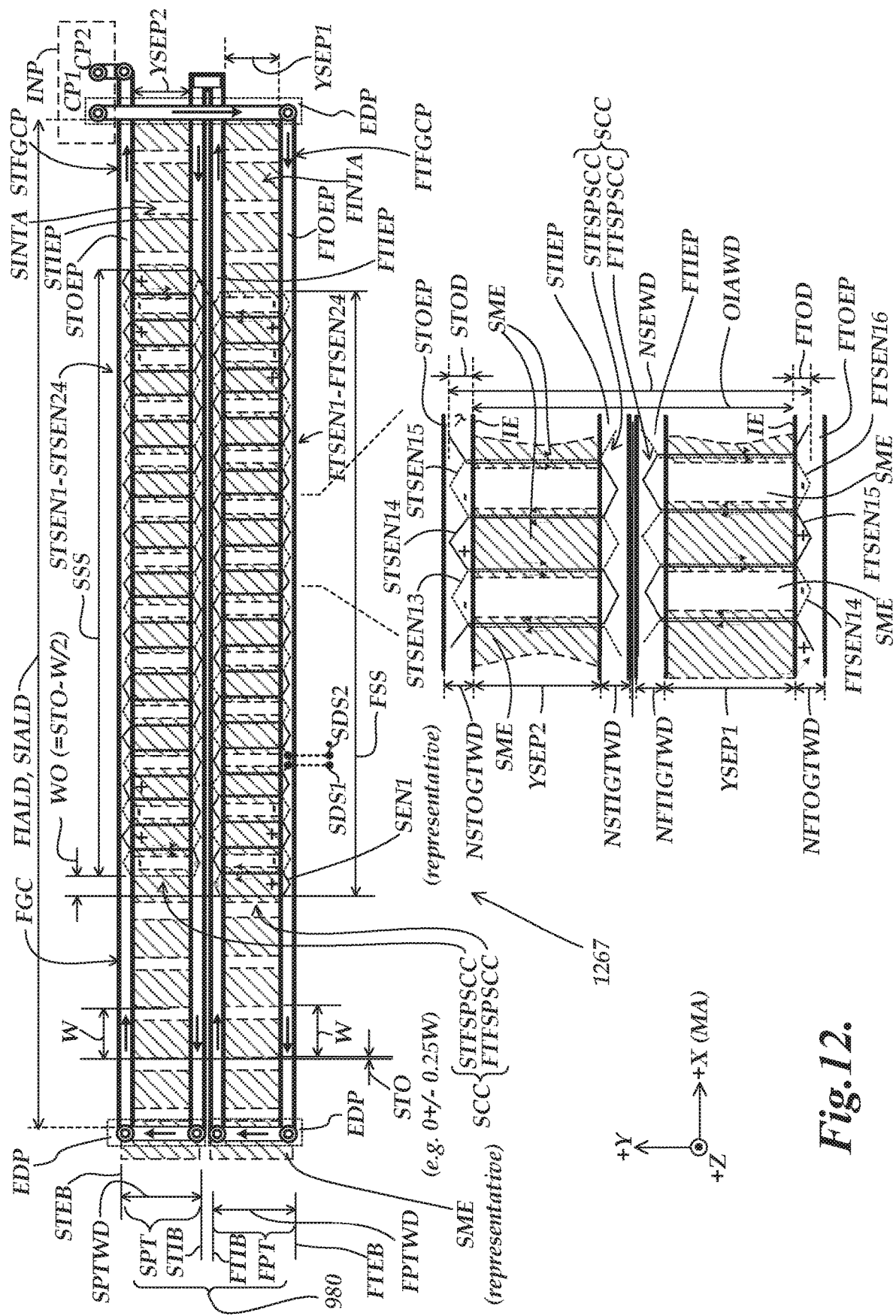
FIG. 12 is a plan view diagram illustrating an eighth exemplary implementation of a detector portion and a compatible scale pattern usable in an electronic position encoder.

FIG. 12 is a plan view diagram illustrating an eighth exemplary implementation of a detector portion 1267 that is functionally analogous to the detector portion 1067 and that is also compatible with the previously described scale pattern 980. Elements designated by reference numbers or labels in FIG. 12 that are similar or identical to those in FIG. 10 designate analogous elements, and may be understood to operate similarly. The detector portion 1267 and a compatible scale pattern 980 provide certain advantages similar to those previously described for the detector portion 1067.

The field generating coil configuration FGC of the detector portion 1267 may be similar or identical to that of the detector portion 1067. Only significant differences of the detector portion 1267 in comparison to the detector portion 1067 will be described below.

In the detector portion 1267, the sensing coil configuration SCC comprised first track windings FTSEN and second track windings STSEN, that were provide in pairs, as portions of a corresponding sensing loop referred to as a sensing element SEN. In one manner of describing this arrangement, in the detector portion 1067, first track windings FTSEN located in a respective winding zone of the first track first spatial phase signal sensing coil configuration FTFSPSCC comprise first and second conductor segments that are aligned transverse to the x-axis direction in the first interior area FINTA. The first conductor segment is serially connected through a first serial connection to output a sensing current directly to a conductor segment (e.g., of a second track winding portion STSEN) that is aligned transverse to the x-axis direction in the second interior area SINTA to form a portion of a winding (e.g., of a second track winding portion STSEN) of the second track first spatial phase signal sensing coil configuration STFSPSCC. Furthermore, the second conductor segment is serially connected through a second serial connection to input a sensing current directly from a conductor segment (e.g., of a second track winding portion STSEN) that is aligned transverse to the x-axis direction in the second interior area SINTA to form a portion of a winding (e.g., of a second track winding portion STSEN) of the second track first spatial phase signal sensing coil STFSPSCC. The first and second serial connections provide a crossover or twist in a region between the first and second interior areas FINTA and SINTA.

In contrast, in the detector portion 1267, the sensing coil configuration SCC comprises first track windings FTSEN and second track windings STSEN, that are provided "separately" in the first and second track first spatial phase signal sensing coil configurations FTFSPSCC and STFSPSCC, which are serially connected only at their ends to the right in FIG. 12, as illustrated. One exemplary configuration for the conductors used to provide the first and second track first spatial phase signal sensing coil configurations FTFSPSCC and STFSPSCC is shown at the bottom of FIG. 12. Otherwise, it will be understood that the detector portion 1267 has similar configuration features provided according to principles previously outlined with reference to the detector portion 1067, and provides similar advantages.

Figure 13:
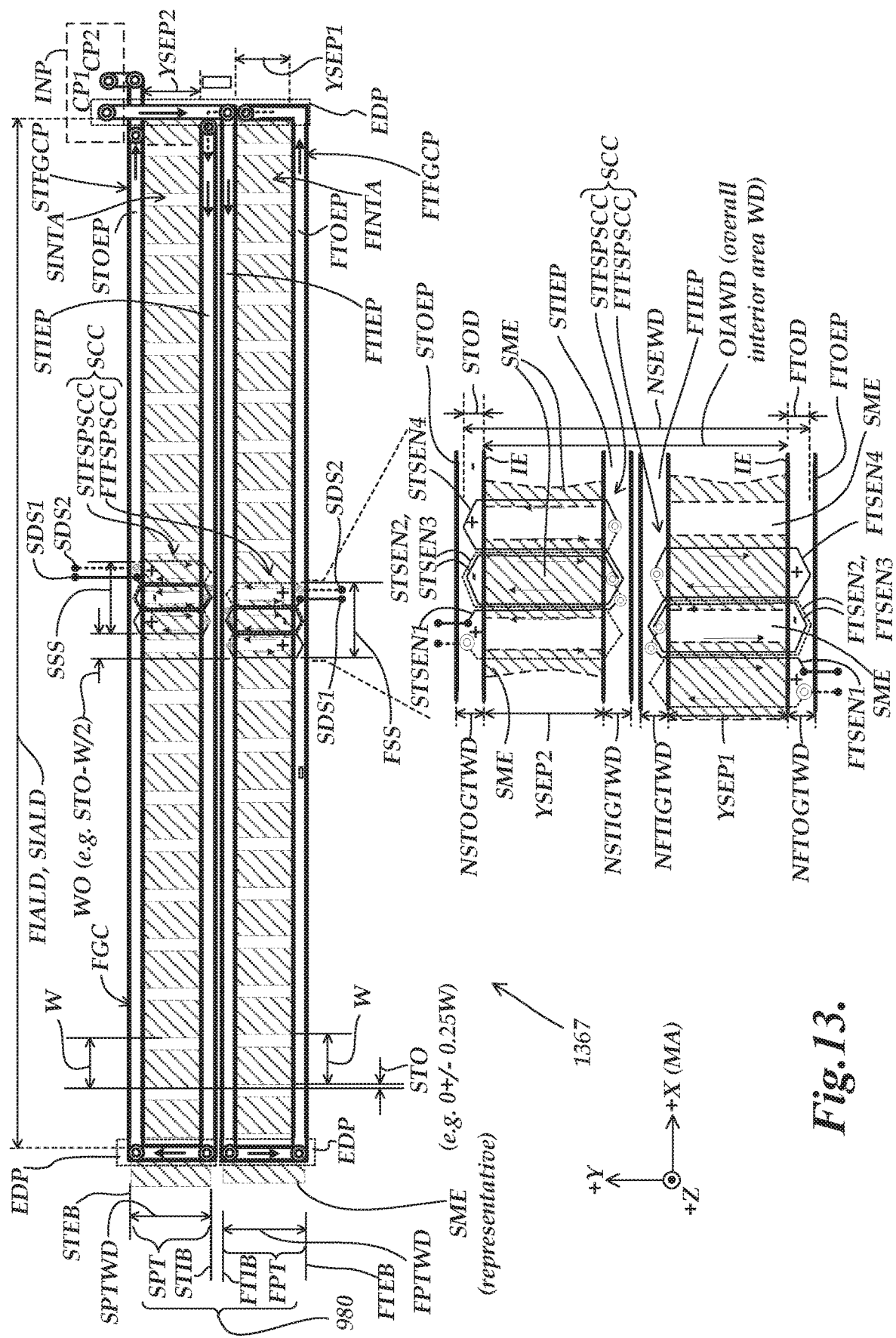
FIG. 13 is a plan view diagram illustrating a ninth exemplary implementation of a detector portion and a compatible scale pattern usable in an electronic position encoder.

FIG. 13 is a plan view diagram illustrating a ninth exemplary implementation of a detector portion 1367 that is functionally analogous to the detector portion 1167 and that is also compatible with the previously described scale pattern 980. Elements designated by reference numbers or labels in FIG. 13 that are similar or identical to those in FIG. 11 designate analogous elements, and may be understood to operate similarly. The detector portion 1367 and a compatible scale pattern 980 provide certain advantages similar to those previously described for the detector portion 1167.

The field generating coil configuration FGC of the detector portion 1367 may be similar or identical to that of the detector portion 1167. It is shown with the same length along the x-axis direction for convenient comparison to the detector 1167, but it will be understood that it may be made significantly shorter if desired, due to the reduced length of the sensing coil configuration SCC in the detector portion 1367. Only significant differences of the detector portion 1367 in comparison to the detector portion 1167 will be described below.

In the detector portion 1167 (as well as in the detector portion 967) each of the first track and second track first spatial phase sensing coil configurations FTFSPSCC and STFSPSCC are configured with positive polarity and negative polarity windings (winding portions), interleaved without interruption along the x-axis direction, in alternating positive and negative polarity zones. In addition, proceeding along the sensing coil configuration from a starting end (e.g., the left end in the figures), the first track first spatial phase signal sensing coil configuration FTFSPSCC has a configuration wherein its starting end winding along the first track FPT has a first winding polarity, and its finishing end winding (e.g., the right end in the figures) has the second winding polarity that is opposite to the first winding polarity; and the second track first spatial phase signal sensing coil configuration STFSPSCC has a configuration wherein its starting end winding along the second track SPT has the first winding polarity, and its finishing end winding has the second winding polarity that is opposite to the first winding polarity.

However, as previously outlined, the particular uninterrupted and uniform first track and second track first spatial phase sensing coil configurations FTFSPSCC and STFSPSCC the detector portion 1167 (as well as in the detector portion 967) are exemplary only, and not limiting. The detector portion 1367 shows one of several possible alternative configurations. In the particular embodiment shown in FIG. 13, the first track first spatial phase sensing coil configuration FTFSPSCCF comprises four first track windings FTSEN. Positive polarity first track windings FTSEN1 and FTSEN4 are located in respective positive polarity winding zones, and two negative polarity first track windings FTSEN2 and FTSEN3 are located in a negative polarity winding zone between them. The second track first spatial phase sensing coil configuration STFSPSCCF comprises four second track windings STSEN. Positive polarity second track windings STSEN1 and STSEN4 are located in respective positive polarity winding zones, and two negative polarity first track windings STSEN2 and STSEN3 are located in a negative polarity winding zone between them.

As a more general description of the sensing coil configuration SCC of the detector portion 1367 and various alternatives that might be used in its place, proceeding along the sensing coil configuration SCC from a starting end (e.g., the left end in FIG. 13) the first track first spatial phase signal sensing coil configuration FTFSPSCC has a configuration wherein its starting end winding (e.g., FTSEN1) along the first track FPT has a first winding polarity (e.g., a positive polarity), and its finishing end winding (e.g., FTSEN4) also has the first winding polarity (e.g., the positive polarity), and at least one winding zone between its starting end winding and its finishing end winding includes two windings (e.g., FTSEN2 and FTSEN3) that have the second winding polarity (e.g., a negative polarity) that is opposite to the first winding polarity. The second track first spatial phase signal sensing coil configuration STFSPSCC has a configuration wherein its starting end winding along the second track has the first winding polarity, and its finishing end winding also has the first winding polarity, and at least one winding zone between its starting end winding and its finishing end winding includes two windings that have the second winding polarity that is opposite to the first winding polarity.

FIG. 13, it may be noted, includes a first set of detector signal output connections SDS1 and SDS2 for the first track first spatial phase signal sensing coil configuration FTFSP-SCC and a second set of detector signal output connections SDS1 and SDS2 for the second track first spatial phase signal sensing coil configuration STFSPSCC. These may carry and/or output the first track first spatial phase signal component and the second track first spatial phase signal component, respectively. In various such embodiments, a signal processing circuit may be operably connected to the detector portion 1367 and the first track first spatial phase signal component and the second track first spatial phase signal component available at these sets of connections may be connected to inputs of the signal processing circuit and combined by signal processing to form a combined first spatial phase signal. This is one alternative method of combining the first track first spatial phase signal component and the second track first spatial phase signal component to form a combined first spatial phase signal in various embodiments disclosed herein. In contrast, the detector portions shown in FIGS. 9-12 use another alternative method wherein the respective windings of first track first spatial phase signal sensing coil configuration FTFSPSCC and the second track first spatial phase signal sensing coil configuration STFSPSCC comprise respective portions of a continuous conductor, and the first track first spatial phase signal component and the second track first spatial phase signal component are inherently combined in the continuous conductor to form the combined first spatial phase signal, which is available at a single set of detector signal output connections SDS1 and SDS2. It will be appreciated that any of the detector portion configurations shown in FIGS. 9-13 may be readily adapted to either method for providing a combined first spatial phase signal.

It will be appreciated that the detector portion 1367 being functionally analogous to the detector portion 1167 suggests a similar detector portion functionally analogous of the detector portion 1267. In such a detector portion the field generating coil configuration FGC would be similar or identical to that of the detector portion 1267 although it may have a reduced length in various implementations. In the detector portion 1267 (as well as in the detector portion 1067) each of the first track and second track first spatial phase sensing coil configurations FTFSPSCC and STFSP-SCC are configured with positive polarity and negative polarity windings (winding portions), interleaved without interruption along the x-axis direction, in alternating positive and negative polarity zones. In addition, proceeding along the sensing coil configuration from a starting end (e.g., the left end in the figures), the first track first spatial phase signal sensing coil configuration FTFSPSCC has a configuration wherein its starting end winding along the first track FPT has a first winding polarity, and its finishing end winding (e.g., the right end in the figures) has the second winding polarity that is opposite to the first winding polarity; and the second track first spatial phase signal sensing coil configuration STFSPSCC has a configuration wherein its starting end winding along the second track SPT has the second winding polarity that is opposite to the first winding polarity, and its finishing end winding has the first winding polarity.

In contrast, as a general description of various functionally analogous sensing coil configurations SCC that might be used in of the place of that previously described for the detector portion 1267, proceeding along the sensing coil configuration SCC from a starting end, its first track first spatial phase signal sensing coil configuration has a configuration wherein its starting end winding along the first track has a first winding polarity, and its finishing end winding also has the first winding polarity, and at least one winding zone between its starting end winding and its finishing end winding includes two windings that have the second winding polarity that is opposite to the first winding polarity. Its second track first spatial phase signal sensing coil configuration has a configuration wherein its starting end winding along the first track has the second winding polarity that is opposite to the first winding polarity, and its finishing end winding also has the second winding polarity that is opposite to the first winding polarity, and at least one winding zone between its starting end winding and its finishing end winding includes two windings that have the first winding polarity.

It will be appreciated that in all of the detector portion configurations illustrated in FIGS. 9-13, the windings of the first and second track first spatial phase signal sensing coils FTFSPSCC and STFSPSCC may comprise conductors fabricated in a plurality of layers of a printed circuit board, wherein the conductors include feedthroughs that connect between different layers of the printed circuit board, and no feedthroughs are included in the portions of the windings that are located in the first and second interior areas FINTA and SINTA. This is advantageous in that signal imbalances associated with loop area imbalances that would otherwise be associated with non-ideal conductor routings, required in order to accommodate the feedthroughs, are largely eliminated because they fall outside the dominant signal generating areas of the first and second track first spatial phase signal sensing coils FTFSPSCC and STFSPSCC in the first and second interior areas FINTA and SINTA.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein.

As one example, the exemplary principles described and emphasized with reference to FIGS. 9-13 are illustrated in combination with the various exemplary dimensions and dimensional relationships along the y-axis direction described and emphasized with reference to FIGS. 7 and 8. However, such combinations are exemplary only and not limiting. More generally, the exemplary principles described and emphasized with reference to FIGS. 9-13 may provide certain benefits when used in other detector portion configurations independent of such constraints on dimensions and dimensional relationships along the y-axis direction, as will be apparent to one skilled in the art based on the principles disclosed herein.

As another example, it will be appreciated that the signal modulating elements SME may comprise loop elements or plate elements, or material property variation, in various implementations and/or may have a dimension along the x-axis direction of W/2, or more or less than W/2, to produce a desired periodic signal profile in various implementations. As another example, it will be appreciated that various features and principles disclosed herein may be applied to rotary position encoders, wherein a circular measuring axis direction and a radial direction are analogous to the x-axis direction and y-axis direction referred to in the description above.

More generally, the various implementations and features described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. An electronic position encoder usable to measure a relative position between two elements along a measuring axis direction that coincides with an x-axis direction, the electronic position encoder comprising:

a scale extending along the measuring axis direction and including a signal modulating scale pattern comprising first and second pattern tracks arranged parallel to one another, each pattern track comprising field attenuating elements that locally attenuate a changing magnetic flux to a relatively larger degree, and field sustaining elements that locally attenuate a changing magnetic flux to a relatively smaller degree or locally enhance the changing magnetic flux, and wherein the field attenuating elements and the field sustaining elements are interleaved along the x-axis direction in a periodic pattern that has a spatial wavelength W; and a detector portion configured to be mounted proximate to the pattern tracks and to move along the measuring axis direction relative to the pattern tracks, the detector portion comprising: a field generating coil configuration comprising at least one field generating loop fixed on a substrate, the field generating coil configuration configured to provide a changing first magnetic flux in a first interior area aligned with the first pattern track in response to a coil drive signal, and to provide a changing second magnetic flux in a second interior area aligned with the second pattern track, in response to a coil drive signal;

a sensing coil configuration comprising:

a first track first spatial phase signal sensing coil configuration arranged in the first interior area, comprising a set of N positive polarity windings distributed in positive polarity winding zones that repeat along the x-axis direction corresponding to the spatial wavelength W, and a set of N negative polarity windings distributed in negative polarity winding zones that alternate with the positive polarity winding zones and repeat along the x-axis direction corresponding to the spatial wavelength W, wherein N is an integer that is at least 2, and wherein the positive and negative polarity windings each respond to a local effect on the changing magnetic flux provided by adjacent field attenuating elements or field sustaining elements and provide signal contributions to a first track first spatial phase signal component provided by the first track first spatial phase signal sensing coil configuration; and a second track first spatial phase signal sensing coil configuration arranged in the second interior area, comprising a set of M positive polarity windings distributed in positive polarity winding zones that repeat along the x-axis direction corresponding to the spatial wavelength W, and a set of M negative polarity windings distributed in negative polarity winding zones that alternate with the positive polarity winding zones and repeat along the x-axis direction corresponding to the spatial wavelength W, where M is an integer that is at least 2, and wherein the positive and negative polarity windings each respond to a local effect on the changing magnetic flux provided by adjacent field attenuating elements or field sustaining elements and provide signal contributions to a second track first spatial phase signal component provided by the second track first spatial phase signal sensing coil configuration;

wherein:

the first track first spatial phase signal sensing coil configuration and the second track first spatial phase signal sensing coil configuration define first and second sensing spans, respectively, along the x-axis direction, and the first and second sensing spans are not aligned with one another along the x-axis direction and the first track first spatial phase signal sensing coil configuration and the second track first spatial phase signal sensing coil configuration are not symmetrical to one another with respect to a border line along the x-axis direction between the first and second pattern tracks;

the periodic pattern of the second pattern track is aligned with or shifted along the x-axis direction relative the periodic pattern of the first pattern track by a scale track pattern offset STO that is not 0.5*W; and the electronic position encoder is further configured, wherein:

the field generating coil configuration is configured to provide changing magnetic flux of opposite polarities in the first interior area along the first pattern track and the second interior area along the second pattern track; and proceeding along the sensing coil configuration from a starting end, the first track first spatial phase signal sensing coil configuration has a configuration wherein its starting end winding along the first track has a first winding polarity, and the second track first spatial phase signal sensing coil configuration has a configuration wherein its starting end winding along the second track also has the first winding polarity, and the starting end windings along the first and second tracks are offset from one another by a winding offset WO=STO+/−0.5*W along the x-axis direction.

2. The electronic position encoder of claim 1, wherein N=M.

3. The electronic position encoder of claim 1, wherein the scale pattern offset STO is within a range 0+/−0.25 W.

4. The electronic position encoder of claim 3, wherein the scale pattern offset STO is zero.

5. The electronic position encoder of claim 3, wherein, proceeding along the sensing coil configuration from the starting end: the first track first spatial phase signal sensing coil configuration has a configuration wherein its starting end winding along the first track has the first winding polarity, and its finishing end winding has the second winding polarity that is opposite to the first winding polarity; and the second track first spatial phase signal sensing coil configuration has a configuration wherein its starting end winding along the second track has the first winding polarity, and its finishing end winding has the second winding polarity that is opposite to the first winding polarity.

6. The electronic position encoder of claim 3, wherein, proceeding along the sensing coil configuration from the starting end: the first track first spatial phase signal sensing coil configuration has a configuration wherein its starting end winding along the first track has the first winding polarity, and its finishing end winding also has the first winding polarity, and at least one winding zone between its starting end winding and its finishing end winding includes two windings that have the second winding polarity that is opposite to the first winding polarity; and the second track first spatial phase signal sensing coil configuration has a configuration wherein its starting end winding along the second track has the first winding polarity, and its finishing end winding also has the first winding polarity, and at least one winding zone between its starting end winding and its finishing end winding includes two windings that have the second winding polarity that is opposite to the first winding polarity.

7. The electronic position encoder of claim 3, wherein at least a majority of the windings located in a respective winding zone of the first track first spatial phase signal sensing coil comprise: a first conductor segment that is aligned transverse to the x-axis direction in the first interior area and that is serially connected through a first serial connection to output a sensing current directly to a conductor segment that is aligned transverse to the x-axis direction in the second interior area to form a portion of a winding of the second track first spatial phase signal sensing coil; and a second conductor segment that is aligned transverse to the x-axis direction in the first interior area and that is serially connected through a second serial connection to input a sensing current directly from a conductor segment that is aligned transverse to the x-axis direction in the second interior area to form a portion of a winding of the second track first spatial phase signal sensing coil.

8. The electronic position encoder of claim 7, wherein the windings of the first and second track first spatial phase signal sensing coil comprise conductors fabricated in layers of a printed circuit board, wherein the conductors include feedthroughs that connect between different layers of the printed circuit board, and no feedthroughs are included in the portions of the windings that are located in the first and second interior areas.

9. The electronic position encoder of claim 1, wherein the first track first spatial phase signal component and the second track first spatial phase signal component are combined to form a combined first spatial phase signal.

10. The electronic position encoder of claim 9, wherein the respective windings of the first track first spatial phase signal sensing coil configuration and the second track first spatial phase signal sensing coil configuration comprise respective portions of a continuous conductor, and the first track first spatial phase signal component and the second track first spatial phase signal component are inherently combined in the continuous conductor to form the combined first spatial phase signal.

11. The electronic position encoder of claim 9, wherein a signal processing circuit is operably connected to the detector portion, and the first track first spatial phase signal component and the second track first spatial phase signal component are connected to inputs of the signal processing circuit and combined by signal processing to form the combined first spatial phase signal.

* * * * *